(12) United States Patent  
Ishikawa et al.

(10) Patent No.: US 7,701,906 B2  
(45) Date of Patent: Apr. 20, 2010

(54) MOBILE STATION, MOBILE COMMUNICATION SYSTEM, HANDOVER CONTROL METHOD, HANDOVER CONTROL PROGRAM AND RECORDING MEDIUM

(75) Inventors: Yoshihiro Ishikawa, Yokosuka (JP); Takahiro Hayashi, Yokosuka (JP); Mikio Iwamura, Zushi (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1661 days.

(21) Appl. No.: 10/282,138

(22) Filed: Oct. 29, 2002

(65) Prior Publication Data

US 2003/0083070 A1     May 1, 2003

(30) Foreign Application Priority Data

Oct. 30, 2001    (JP)   ............................ 2001-333336

(51) Int. Cl.
     *H04W 4/00*      (2009.01)
(52) U.S. Cl. ........................ 370/332; 370/329; 370/331; 370/348; 455/436; 455/452.2; 455/456.6; 455/522
(58) Field of Classification Search ................. 370/229, 370/331, 332, 348; 455/436, 452.2, 456.6, 455/522
See application file for complete search history.

(56) References Cited

U.S. PATENT DOCUMENTS 5,678,181 A    10/1997    Kamachi (Continued)

FOREIGN PATENT DOCUMENTS

EP      0 655 872      5/1995

(Continued)

OTHER PUBLICATIONS

3GPP TR 25.841 V4.1.0, XP-002246941, pp. 1-13, "3rd Generation Partnership Project; Technical Specification Group Radio Access Network; DSCH Power Control Improvement in Soft Handover (Release 4)", Mar. 31, 2001.

(Continued)

*Primary Examiner*—William Trost, IV  
*Assistant Examiner*—Toan D Nguyen  
(74) *Attorney, Agent, or Firm*—Oblon, Spivak, McClelland, Maier & Neustadt, L.L.P.

(57) ABSTRACT

There is provided a handover control method that does not produce quality deterioration or other similar problems during handover in a mobile communication system in which a first channel shared by a plurality of mobile stations and second channels exclusively used by respective mobile are used in combination. A handover control method according to the present invention comprises: a step in which a data signal is transmitted from one base station 30A to a mobile station 10 by using a first channel; a step in which a control signal is transmitted from a plurality of base stations 30A, 30B including the base station 30A to the mobile station 10 by using a second channel; a step in which the mobile station 10 receives a plurality of control signals; a step in which, of the plurality of control signals received, information regarding reception quality of the control signal from the base station 30A that transmitted the data signal is transmitted from the mobile station 10 to the base station 30A; and a step in which information relating to reception quality is received by the base station 30A and transmission control is performed of the data signal transmitted by the base station 30A, in accordance with the received information relating to reception quality.

10 Claims, 10 Drawing Sheets

U.S. PATENT DOCUMENTS

| | | | |
|---|---|---|---|
| 5,867,786 A * | 2/1999 | Ishi | 455/436 |
| 5,978,366 A | 11/1999 | Massingill et al. | |
| 6,728,228 B1 * | 4/2004 | Ostman et al. | 370/332 |
| 6,747,969 B1 * | 6/2004 | Hirsch | 370/342 |
| 6,847,818 B1 * | 1/2005 | Furukawa | 455/442 |
| 6,970,438 B2 * | 11/2005 | Mate et al. | 370/329 |
| 7,127,252 B1 * | 10/2006 | Aoki et al. | 455/442 |
| 2001/0015964 A1 * | 8/2001 | Fuchisawa | 370/332 |
| 2002/0009061 A1 | 1/2002 | Willenegger | |
| 2002/0010001 A1 * | 1/2002 | Dahlman et al. | 455/522 |
| 2002/0051431 A1 | 5/2002 | Choi et al. | |
| 2002/0061764 A1 | 5/2002 | Kim et al. | |
| 2002/0082020 A1 | 6/2002 | Lee et al. | |
| 2002/0141331 A1 | 10/2002 | Mate et al. | |

FOREIGN PATENT DOCUMENTS

| | | |
|---|---|---|
| EP | 0 936 751 A2 | 8/1999 |
| EP | 1 204 219 | 5/2002 |
| JP | 2000-13842 | 1/2000 |
| JP | 2001-119342 | 4/2001 |
| JP | 2001-169323 | 6/2001 |
| JP | 2003-516025 | 5/2003 |
| WO | WO 99/59367 | 11/1999 |
| WO | WO 00/77947 | 12/2000 |
| WO | WO 01/39403 A1 | 5/2001 |

OTHER PUBLICATIONS

3GPP TS 25.211 V3.7.0, XP-002902457, pp. 1-45, "3$^{rd}$ Generation Partnership Project; Technical Specification Group Radio Access Network; Physical Channels and Mapping of Transport Channels Onto Physical Channels (FDD) (Release 1999)", Jun. 2001.

"DSCH Tx Diversity Operation in SHO Region", Samsung, 3GPP TSG-RAN WG1, Meeting # 16, R1-00-1270, Oct. 12, 2000, pp. 1-5.

* cited by examiner

MOBILE STATION, MOBILE COMMUNICATION SYSTEM, HANDOVER CONTROL METHOD, HANDOVER CONTROL PROGRAM AND RECORDING MEDIUM

BACKGROUND OF THE INVENTION

1. Field of the Invention

The present invention relates to a mobile station, mobile communication system, handover control method, handover control program and recording medium.

2. Related Background Art

In mobile communication systems such as those of mobile telephones which are currently commonplace, service is provided with the entire service area divided into comparatively small zones called cells. Such a system is constituted by a plurality of base stations that cover the plurality of divided wireless zones and mobile stations that perform communication by setting up wireless channels with these base stations.

Electromagnetic waves that are transmitted with a given transmission power from the base stations are attenuated as they are propagated through space until they arrive at the reception point. Since electromagnetic waves have the property that their attenuation increases as the distance between the transmission point and reception point increases, essentially pilot channels that are transmitted from distant base stations are received with a weak reception level while pilot channels that are transmitted from near base stations are received with a strong reception level. In fact, the magnitude of propagation loss depends not only on distance but also on circumstances such as topography or buildings, so the received power of the pilot channels from various base stations fluctuates considerably with movement of a mobile station. In order to receive the signal transmitted from the base stations with better quality, it is important for the mobile station to constantly monitor the pilot channels from the various base stations and to select the optimum base station. By applying such control, the base station that is evaluated as optimum successively changes every time the base station is moved, so the base station that is connected with the mobile station also successively changes. The control of successive changeover of the base stations that are connected as movement takes place is termed "handover control".

Handover control may be "hard handover" or "soft handover". In case of hard handover, the number of base stations which the base station is connected to is always one, and the base station which the mobile station is connected to is changed over as movement takes place. In contrast, soft handover is a method of control whereby the mobile station can be connected with a plurality of base stations, the mobile station being connected with at least one base station and, depending on circumstances, with a plurality of base stations. In this handover, the base station that is connected with the mobile station is added or deleted, tracking the movement of the mobile station. "Diversity handover" is a type of soft handover. Diversity handover is characterized in that signals transmitted from a plurality of base stations can be received in combined fashion by a mobile station or signals transmitted from a mobile station can be received and combined at a plurality of base stations, so reception quality can be improved by the diversity effect.

As a method of exchanging the so-called packet data between base stations and mobile stations, in particular a method of exchanging packet data by a downlink circuit from base stations in the direction of mobile stations, the method is sometimes adopted of multiplexing and transmitting data of a plurality of the mobile stations on a single or a plurality of channels shared by a plurality of mobile stations. As the method of this multiplexing, time division multiplexing or code division multiplexing or frequency division multiplexing etc may be employed and, in addition, the scheduling of data transmission to mobile stations of different types can be efficiently achieved by various types of algorithm at the base station end. When such shared channels are employed, the various base stations typically use dedicated channels as well for notification of the timing of data transmission to the mobile stations or control of transmission power, or transmitting an uplink (transmission from the mobile station to the base station) data arrival confirmation signal. Usually, for such dedicated channels, channels are prepared that are of comparatively low bit rate so that they have little effect on the overall capacity etc. For example, in the W-CDMA (Wideband Code Division Multiple Access) system whose development is proceeding as a third generation mobile communication system and which is being provided as a service in Japan from May 2001. In the standards provided by the 3GPP (Third Generation Partnership Project), a PDSCH (Physical Downlink Shared Channel) is specified as a channel (physical channel) shared by a plurality of users and an A-DPCH (Associated Dedicated Physical Channel) is specified as a channel for exclusive use by each user in conjunction therewith.

SUMMARY OF THE INVENTION

Considering handover in a system in which PDSCH and A-DPCH are employed in combination as described above, although diversity handover can be applied in the case of A-DPCH, in the case of PDSCH, since this is shared by a plurality of users, it is difficult to achieve scheduling of transmission data at respective base stations, so it is difficult to apply diversity handover. Consequently, in a system in which PDSCH shared by a plurality of mobile stations and A-DPCH which is exclusively used by the respective mobile stations are employed in combination, hard handover is employed for the PDSCH while soft handover is employed for the A-DPCH. However, since PDSCH transmission control is performed in accordance with the reception quality of the control signal transmitted on the A-DPCH and, since soft handover applied to A-DPCH provided better reception quality than hard handover applied to PDSCH. The data reception quality on PDSCH may deteriorate due to a quality imbalance between PDSCH and A-DPCH. Furthermore, since lowered reception quality is associated with retransmission of non-arriving data, the overall amount of transmitted data increases and data addressed to other mobile stations suffer more delay. The number of subscribers, therefore, that can finally be accommodated is reduced.

Accordingly, in order to solve the above problem, in a mobile communication system wherein a first channel shared by a plurality of mobile stations and a second channel exclusively used by respective mobile stations are employed in combination, an objective of the present invention is to provide a mobile station, mobile communication system, handover control method, handover control program and recording medium wherein quality deterioration or increased delay or reduction in the number of accommodated subscribers does not arise.

According to the present invention, a mobile station applied to a mobile communication system in which data transmission from base stations to a mobile station is performed using a first channel shared by a plurality of mobile stations and second channels exclusively used by respective mobile stations, comprises: a data signal reception section that receives a data signal transmitted from one of base stations through the first channel; a control signal reception section that receives a control signal transmitted from a plurality of base stations through a second channel; and a reception quality information transmission section that transmits to the base station information regarding the reception quality of the control signal from the base station that is the transmission source of the data signal received by the data signal reception section, of the plurality of control signals received by the control signal reception section.

With such a mobile station, during handover, control signals transmitted from a plurality of base stations are received by a second channel and, of the plurality of control signals that are received, the control signal from the base station that performed data transmission by means of the first channel is selected and information relating to the reception quality of this control signal (reception quality information) is transmitted to the base station. In this way, transmission control of the data signal that is transmitted by the base station can be performed in accordance with this reception quality information and the reception quality of the data signal can be maintained by maintaining a balance of the quality of the control signal that is transmitted by the second channel and the quality of the data signal that is transmitted by the first channel.

A mobile station according to the present invention, which is applied to a mobile communication system in which data transmission from base stations to a mobile station is performed by a first channel shared by a plurality of mobile stations and second channels exclusively used by respective mobile stations, comprises: a data signal reception section that receives a data signal transmitted from one of base stations through the first channel; a control signal reception section that selects and receives a control signal from the base station that is the transmission source of the data signal received by the data signal reception section, of the plurality of control signals transmitted by the second channel; and a reception quality information transmission section for transmitting to the base station information regarding reception quality of the control signal received by the control signal reception section.

With such a mobile station, during handover, of the control signals transmitted from a plurality of base stations by the second channel, the control signal from the base station that performed data transmission by means of the first channel is selectively received and information relating to the reception quality of this control signal is transmitted to the base station. In this way, transmission control of the data signal that is transmitted by the base station can be performed in accordance with this reception quality information and the reception quality of the data signal can be maintained by maintaining a balance of the quality of the control signal that is transmitted by the second channel and the quality of the data signal that is transmitted by the first channel.

A mobile station according to the present invention applied to a mobile communication system in which data transmission from base stations to mobile stations is performed by a first channel shared by a plurality of mobile stations and second channels exclusively used by respective mobile stations, comprises: a data signal reception section that receives a data signal transmitted from one of base stations by the first channel; a control signal reception section that receives a control signal transmitted from a plurality of base stations by the second channel;

and a reception power information transmission section that transmits to the base station information regarding the reception power of the control signal from the base station that is the transmission source of the data received by the data signal reception section, of the plurality of control signals received by the control signal reception section.

With such a mobile station, during handover, control signals transmitted from a plurality of base stations are received by a second channel and, of the plurality of control signals that are received, the control signal from the base station that performed data transmission by means of the first channel is selected and information relating to the reception power of this control signal is transmitted to the base station. In this way, transmission power control of the data signal that is transmitted by the base station can be performed in accordance with this reception power information and the reception quality of the data signal can be maintained by maintaining a balance of the quality of the control signal that is transmitted by the second channel and the quality of the data signal that is transmitted by the first channel.

A mobile station according to the present invention applied to a mobile communication system in which data transmission from base stations to mobile stations is performed by a first channel shared by a plurality of mobile stations and second channels exclusively used by respective mobile stations, comprises: a data signal reception section that receives a data signal transmitted from one of base stations through the first channel; a control signal reception section that selectively receives a control signal from the base station that is the transmission source of the data signal received by the data signal reception section, of the plurality of control signals transmitted by the second channel; and a reception power information transmission section for transmitting to the base station information regarding the reception power of the control signal received by the control signal reception section.

With such a mobile station, during handover, of the control signals transmitted from a plurality of base stations by the second channel, the control signal from the base station that performed data transmission by means of the first channel is selectively received and information relating to the reception power of this control signal is transmitted to the base station. In this way, control of transmission power of the data signal that is transmitted by the base station can be performed in accordance with this reception power information and the reception quality of the data signal can be maintained by maintaining a balance of the quality of the control signal that is transmitted by the second channel and the quality of the data signal that is transmitted by the first channel.

A mobile communication system according to the present invention in which data transmission from base stations to mobile stations is performed by a first channel shared by a plurality of mobile stations and second channels exclusively used by respective mobile stations, comprises: a mobile station; base stations that transmit a data signal and a control signal to the mobile station; and a control device that performs transmission control of the data signal and control signal transmitted by the base stations, in which the control device performs transmission control of the data signal transmitted by the first channel in accordance with reception quality information transmitted from the mobile stations.

A mobile communication system according to the present invention comprises a control device that performs transmission control of the data signal and a control signal from the base station to the mobile station and this control device performs transmission control of the data signal transmission by the first channel in accordance with the reception quality information transmitted from the mobile station. In this way, the reception quality of the data signal can be maintained by maintaining a balance of the quality of the control signal transmitted by the second channel and the quality of the data signal transmitted by the first channel.

A mobile communication system according to the present invention in which data transmission from base stations to mobile stations is performed by a first channel shared by a plurality of mobile stations and second channels exclusively used by respective mobile stations comprises: a mobile station; base stations that transmit a data signal and a control signal to the mobile station; and a control device that performs transmission control of the data signal and control signal transmitted by the base station, in which the control device performs control of the transmission power of the data signal transmitted by the first channel in accordance with reception quality information transmitted from the mobile stations.

A mobile communication system according to the present invention comprises a control device that performs transmission control of the data signal and a control signal from the base station to the mobile station and this control device control the transmission power of the data signal transmission by the first channel in accordance with the reception quality information transmitted from the mobile station. In this way, the reception quality of the data signal can be maintained by maintaining a balance of the quality of the control signal transmitted by the second channel and the quality of the data signal transmitted by the first channel.

A mobile communication system according to the present invention in which data transmission from base stations to mobile stations is performed by a first channel shared by a plurality of mobile stations and second channels exclusively used by respective mobile stations, comprises: a mobile station; base stations that transmit a data signal and a control signal to the mobile station; and a control device that performs transmission control of the data signal and control signal transmitted by the base station, in which the control device performs control of the transmission power of the data signal transmitted by the first channel in accordance with reception power information transmitted from the mobile stations.

A mobile communication system according to the present invention comprises a control device that performs transmission control of the data signal and the control signal from the base station to the mobile station and this control device performs transmission power control of the data signal transmission by the first channel in accordance with the reception power information transmitted from the mobile station. In this way, the reception quality of the data signal can be maintained by maintaining a balance of the quality of the control signal transmitted by the second channel and the quality of the data signal transmitted by the first channel.

A mobile communication system according to the present invention in which data transmission from base stations to mobile stations is performed by a first channel shared by a plurality of mobile stations and second channels exclusively used by respective mobile stations, comprises: a mobile station; base stations that transmit a data signal and a control signal to the mobile station; and a control device that performs transmission control of the data signal and control signal transmitted by the base station, in which the mobile station comprises a data signal reception section that receives a data signal transmitted from one of base stations through the first channel; a control signal reception section that receives control signals transmitted from a plurality of base stations by the second channel; and a reception quality information transmission section that transmits to the base station information regarding the reception quality of a plurality of control signals received by the control signal reception section; and in which the control device performs transmission control of the data signal transmitted by the first channel in accordance with reception quality information in respect of the control signal of the base station that transmitted a data signal by the first channel, of the plurality of items of reception quality information transmitted from the mobile stations.

With a mobile communication system according to the present invention, a mobile station transmits to the base station information relating to reception quality of the control signals transmitted from a plurality of base stations and the control device performs transmission control of the data signal transmitted from the base station to the mobile station by the first channel in accordance with the reception quality information of the control signal of the base station that transmits the data signal, of the plurality of items of reception quality information transmitted from the mobile stations. In this way, the reception quality of the data signal can be maintained by maintaining a balance of the quality of the control signal transmitted by the second channel and the quality of the data signal transmitted by the first channel.

A mobile communication system according to the present invention in which data transmission from base stations to mobile stations is performed by a first channel shared by a plurality of mobile stations and second channels exclusively used by respective mobile stations, comprises: a mobile station; base stations that transmit a data signal and a control signal to the mobile station; and a control device that performs transmission control of the data signal and control signal transmitted by the base stations, in which a mobile station comprises a data signal reception section that receives a data signal transmitted from one of base stations through the first channel; a control signal reception section that receives control signals transmitted from a plurality of base stations by the second channel; and a reception quality information transmission section that transmits to the base station information regarding the reception quality of a plurality of control signals received by the control signal reception section; and in which the control device performs transmission power control of the data signal transmitted by the first channel in accordance with reception quality information in respect of the control signal of the base station that transmitted a data signal by the first channel, of the plurality of items of reception quality information transmitted from the mobile station.

With a mobile communication system according to the present invention, a mobile station transmits to the base station information relating to reception quality of the control signal transmitted from a plurality of base stations and the control device performs transmission power control of the data signal transmitted from the base station to the mobile station by the first channel in accordance with the reception quality information of the control signal of the base station that transmits the data signal, of the plurality of items of reception quality information transmitted from the mobile stations. In this way, the reception quality of the data signal can be maintained by maintaining a balance of the quality of the control signal transmitted by the second channel and the quality of the data signal transmitted by the first channel.

A mobile communication system according to the present invention in which data transmission from base stations to mobile stations is performed by a first channel shared by a plurality of mobile stations and second channels exclusively used by respective mobile stations, comprises: a mobile station; base stations that transmit a data signal and a control signal to the mobile station; and a control device that performs transmission control of the data signal and control signal transmitted by the base station, in which the mobile station comprises a data signal reception section that receives a data signal transmitted from one of base stations through the first channel; a control signal reception section that receives a control signal transmitted from a plurality of base stations by the second channel; and a reception quality information transmission section that transmits to the base station information regarding the reception power of a plurality of control signals received by the control signal reception section; and in which the control device performs transmission power control of a data signal transmitted by the first channel in accordance with reception power information in respect of the control signal of the base station that transmitted a data signal by the first channel, of the plurality of items of reception power information transmitted from the mobile stations.

With a mobile communication system according to the present invention, a mobile station transmits to the base station information relating to reception power of the control signal transmitted from a plurality of base stations and the control device performs transmission power control of the data transmission transmitted from the base station to the mobile station by the first channel in accordance with the reception power information of the control signal of the base station that transmits the data signal, of the plurality of items of reception quality information transmitted from the mobile stations. In this way, the reception quality of the data signal can be maintained by maintaining a balance of the quality of the control signal transmitted by the second channel and the quality of the data signal transmitted by the first channel.

According to the present invention, a handover control method in a mobile communication system in which data transmission from base stations to mobile stations is performed by a first channel shared by a plurality of mobile stations and second channels exclusively used by respective mobile stations, comprises: a data signal transmission step of transmitting a data signal from one of said base stations to said mobile station through said first channel; a control signal transmission step of transmitting control signals from a plurality of base stations including said one base station to said mobile station through said second channel; a control signal reception step in which said mobile station receives a plurality of control signals transmitted in said control signal transmission step; a reception quality information transmission step of transmitting, of the plurality of control signals received in said control signal reception step, information regarding reception quality of the control signal from the base station that transmitted the data signal in said data signal transmission step from said mobile station to said base station; and a transmission control step of receiving information relating to reception quality transmitted from said mobile station in said reception quality information transmission step, and performing transmission control on the data signal transmitted by said base station, in accordance with the received information relating to reception quality.

In this way, during handover, control signals transmitted by the second channel from a plurality of base stations are received and, of the plurality of received control signals, the control signal from the base station that performs data transmission by the first channel is selected and information relating to the reception quality of this control signal is transmitted to the base station. Thus transmission control of the data signal transmission from this base station to the mobile station is performed in accordance with the reception quality information that was transmitted. In this way, the reception quality of the data signal can be maintained by maintaining a balance of the quality of the control signal transmitted by the second channel and the quality of the data signal transmitted by the first channel.

A handover control method in a mobile communication system in which data transmission from base stations to mobile stations is performed by using a first channel shared by a plurality of mobile stations and second channels exclusively used by respective mobile stations, according to the invention, comprises: a data signal transmission step of transmitting a data signal from one of said base stations to said mobile station through said first channel; a control signal transmission step of transmitting control signals from a plurality of base stations including said one base station in respect of said mobile station through said second channel; a control signal reception step in which, of the plurality of control signals transmitted in said control signal transmission step, said mobile station selects and receives a control signal from the base station that transmitted the data signal in said data signal transmission step; a reception quality information transmission step of transmitting information regarding the reception quality of the control signal received in said control signal reception step from said mobile station to said base station; and a transmission control step of receiving information relating to reception quality transmitted from said mobile station in said reception quality information transmission step, and performing transmission control on the data signal transmitted by said base station, in accordance with the received information relating to reception quality.

In this way, during handover, of the control signals transmitted by the second channel from a plurality of base stations, the control signal from the base station that performed data transmission by means of the first channel is selectively received and information relating to the reception quality of this control signal is transmitted to the base station. Thus, transmission control of the data signal transmission from this base station to the mobile station can be performed in accordance with this transmitted reception quality information. In this way, the reception quality of the data signal can be maintained by maintaining a balance of the quality of the control signal that is transmitted by the second channel and the quality of the data signal that is transmitted by the first channel.

A handover control method in a mobile communication system in which data transmission from base stations to mobile stations is performed by using a first channel shared by a plurality of mobile stations and second channels exclusively used by respective mobile stations, according to the present invention, comprises: a data signal transmission step of transmitting a data signal from one of said base stations to said mobile station through said first channel; a control signal transmission step of transmitting a control signal from a plurality of base stations including said one base station to said mobile station through said second channel; a control signal reception step in which said mobile station receives a plurality of control signals transmitted in said control signal transmission step; a reception quality information transmission step of transmitting, of the plurality of control signals received in said control signal reception step, information regarding reception quality of the control signal from the base station that transmitted the data signal in said data signal transmission step from said mobile station to said base station; and a transmission power control step of receiving information relating to reception quality transmitted from said mobile station in said reception quality information transmission step, and performing transmission power control on the data signal transmitted by said base station, in accordance with the received information relating to reception quality.

In this way, during handover, control signals transmitted by the second channel from a plurality of base stations are received and, of the plurality of received control signals, the control signal from the base station that performs data transmission by the first channel is selected and information relating to the reception quality of this control signal is transmitted to the base station. Thus transmission power control of the data signal transmission from this base station to the mobile station is performed in accordance with the reception quality information that was transmitted. In this way, the reception quality of the data signal can be maintained by maintaining a balance of the quality of the control signal transmitted by the second channel and the quality of the data signal transmitted by the first channel.

A handover control method in a mobile communication system in which data transmission from base stations to mobile stations is performed by using a first channel shared by a plurality of mobile stations and second channels exclusively used by respective mobile stations, according to the present invention, comprises: a data signal transmission step of transmitting a data signal from one of said base stations to said mobile station through said first channel; a control signal transmission step of transmitting a control signal from a plurality of base stations including said one base station to said mobile station through said second channel; a control signal reception step in which, of the plurality of control signals transmitted in said control signal transmission step, said mobile station selects and receives a control signal from the base station that transmitted the data signal in said data signal transmission step; a reception quality information transmission step of transmitting information regarding the reception quality of the control signal received in said control signal reception step from said mobile station to said base station; and a transmission power control step of receiving information relating to reception quality transmitted from said mobile station in said reception quality information transmission step, and performing transmission power control on the data signal transmitted by said base station, in accordance with the received information relating to reception quality.

In this way, during handover, of the control signals transmitted from a plurality of base stations by the second channel, the control signal from the base station that performed data transmission by means of the first channel is selectively received and information relating to the reception quality of this control signal is transmitted to the base station. Thus, transmission power control of the data signal transmission from this base station to the mobile station can be performed in accordance with this transmitted reception quality information. In this way, the reception quality of the data signal can be maintained by maintaining a balance of the quality of the control signal that is transmitted by the second channel and the quality of the data signal that is transmitted by the first channel.

A handover control method in a mobile communication system in which data transmission from base stations to mobile stations is performed by using a first channel shared by a plurality of mobile stations and second channels exclusively used by respective mobile stations, according to the invention, comprises: a data signal transmission step of transmitting a data signal from one of said base stations to said mobile station through said first channel; a control signal transmission step of transmitting a control signal from a plurality of base stations including said one base station to said mobile stations through said second channel; a control signal reception step in which said mobile station receives a plurality of control signals transmitted from said mobile station in said control signal transmission step; a reception power information transmission step of transmitting, of the plurality of control signals received in said control signal reception step, information regarding reception power of the control signal from the base station that transmitted the data signal in said data signal transmission step from said mobile station to said base station; and a transmission power control step of receiving information relating to reception power transmitted from said mobile station in said reception power information transmission step, and performing transmission power control on the data signal transmitted by said base station, in accordance with the received information relating to reception power.

In this way, during handover, control signals transmitted by the second channel from a plurality of base stations are received and, of the plurality of received control signals, the control signal from the base station that performs data transmission by the first channel is selected and information relating to the reception quality of this control signal is transmitted to the base station. Thus transmission power control of the data signal transmission from this base station to the mobile station is performed in accordance with the reception power information that was transmitted. In this way, the reception quality of the data signal can be maintained by maintaining a balance of the quality of the control signal transmitted by the second channel and the quality of the data signal transmitted by the first channel.

A handover control method in a mobile communication system in which data transmission from base stations to mobile stations is performed by using a first channel shared by a plurality of mobile stations and second channels exclusively used by respective mobile stations, according to the invention, comprises: a data signal transmission step of transmitting a data signal from one of said base stations to said mobile station through said first channel; a control signal transmission step of transmitting a control signal from a plurality of base stations including said one base station to said mobile station through said second channel; a control signal reception step in which, of the plurality of control signals transmitted in said control signal transmission step, said mobile station selects and receives a control signal from the base station that transmitted the data signal in said data signal transmission step; a reception power information transmission step of transmitting information regarding the reception power of the control signal received in said control signal reception step from said mobile station to said base station; and a transmission power control step of receiving information relating to reception power transmitted from said mobile station in said reception power information transmission step, and performing transmission power control on the data signal transmitted by said base station, in accordance with the received information relating to reception power.

In this way, during handover, of the control signals transmitted by the second channel from a plurality of base stations, the control signal from the base station that performed data transmission by means of the first channel is selectively received and information relating to the reception power of this control signal is transmitted to the base station. Thus, transmission power control of the data transmission from this base station to the mobile station can be performed in accordance with this reception power information. In this way, the reception quality of the data signal can be maintained by maintaining a balance of the quality of the control signal that is transmitted by the second channel and the quality of the data signal that is transmitted by the first channel.

A handover control method in a mobile communication system in which data transmission from base stations to mobile stations is performed by using a first channel shared by a plurality of mobile stations and second channels exclusively used by respective mobile stations, according to the invention, comprises: a data signal transmission step of transmitting a data signal from one of said base stations to a mobile station through said first channel; a control signal transmission step of transmitting a control signal from one of said base stations to the mobile station through said second channel; a control signal reception step in which said mobile station receives a plurality of control signals transmitted in said control signal transmission step; a reception quality information transmission step of transmitting information relating to the reception quality of the plurality of control signals received in said control signal reception step from said mobile station to said base stations; and a transmission control step of receiving information relating to the reception quality transmitted from said mobile stations in said reception quality information transmission step, and performing transmission control on the data signal transmitted by said base station, in accordance with the reception quality information in respect of the control signal of the base station that transmitted the data signal through said first channel, of the received information relating to reception quality.

In this way, during handover, control signals transmitted by the second channel from a plurality of base stations are received and information relating to the reception quality of the received control signal is transmitted to the base station. Thus, transmission control of the data signal transmission from this base station to the mobile station can be performed in accordance with this reception quality information of the control signal of the base station that performed data signal transmission by the first channel, of the items of reception quality information transmitted from the mobile station. In this way, the reception quality of the data signal can be maintained by maintaining a balance of the quality of the control signal that is transmitted by the second channel and the quality of the data signal that is transmitted by the first channel.

A handover control method in a mobile communication system in which data transmission from base stations to mobile stations is performed by using a first channel shared by a plurality of mobile stations and second channels exclusively used by respective mobile stations, according to the invention, comprises: a data signal transmission step of transmitting a data signal from one of said base stations to a mobile station through said first channel; a control signal transmission step of transmitting a control signal from a plurality of base stations including said one base station to said mobile station through said second channel; a control signal reception step in which said mobile station receives a plurality of control signals transmitted in said control signal transmission step; a reception quality information transmission step of transmitting information relating to the reception quality of the plurality of control signals received in said control signal reception step from said mobile station to said base stations; and a transmission power control step of receiving information relating to the reception quality transmitted from said mobile stations in said reception quality information transmission step, and performing transmission power control on the data signal transmitted by said base station, in accordance with the reception quality information in respect of the control signal of the base station that transmitted the data signal by said first channel, of the received information relating to reception quality.

In this way, during handover, control signals transmitted by the second channel from a plurality of base stations are received and information relating to the reception quality of the received control signal is transmitted to the base station. Thus, transmission power control of the data signal transmission from this base station to the mobile station is performed in accordance with this reception quality information of the control signal of the base station that performed data signal transmission by the first channel, of the items of reception quality information transmitted from the mobile station. In this way, the reception quality of the data signal can be maintained by maintaining a balance of the quality of the control signal that is transmitted by the second channel and the quality of the data signal that is transmitted by the first channel.

A handover control method in a mobile communication system in which data transmission from base stations to mobile stations is performed by using a first channel shared by a plurality of mobile stations and second channels exclusively used by respective mobile stations, according to the invention, comprises: a data signal transmission step of transmitting a data signal from one of said base stations to a mobile station through said first channel; a control signal transmission step of transmitting a control signal from a plurality of base stations including said one base station to said mobile station through said second channel; a control signal reception step in which said mobile station receives a plurality of control signals transmitted in said control signal transmission step; a reception power information transmission step of transmitting information relating to the reception power of the plurality of control signals received in said control signal reception step from said mobile station to said base stations; and a transmission power control step of receiving information relating to the reception power transmitted from said mobile stations in said reception power information transmission step, and performing transmission power control on the data signal transmitted by said base station, in accordance with the reception power information in respect of the control signal of the base station that transmitted the data signal through said first channel, of the received information relating to reception power.

In this way, during handover, control signals transmitted from a plurality of base stations by the second channel are received and information relating to the reception quality of the received control signal is transmitted to the base station. Thus, transmission power control of the data signal transmission from this base station to the mobile station is performed in accordance with this reception power information of the control signal of the base station that performed data signal transmission by the first channel, of the items of reception power information transmitted from the mobile station. In this way, the reception quality of the data signal can be maintained by maintaining a balance of the quality of the control signal that is transmitted by the second channel and the quality of the data signal that is transmitted by the first channel.

A handover control program according to the present invention which, for controlling handover of a mobile station applied to a mobile communications system in which data transmission from base stations to mobile stations is performed by using a first channel shared by a plurality of mobile stations and second channels exclusively used by respective mobile stations, has a computer constituting a mobile station function as: a data signal reception section that receives a data signal transmitted from one of the base stations through the first channel; a control signal reception section that receives control signals transmitted from a plurality of the base stations by the second channel; and a reception quality information transmission section that transmits to the base station information regarding the reception quality of the control signal from the base station that is the transmission source of the data received by the data signal reception section, of the plurality of control signals received by the control signal reception section.

By executing the handover control program according to the present invention using a computer (mobile station), during handover, the computer causes control signals transmitted by the second channel from a plurality of base stations to be received and, of the plurality of control signals that are received, causes the control signal from the base station that performed data transmission by the first channel to be selected and causes information relating to the reception quality of this control signal to be transmitted to the base station. In this way, transmission control of the data signal transmitted by the base station can be performed in accordance with this reception quality information and the reception quality of the data signal can be maintained by maintaining a balance of the quality of the control signal that is transmitted by the second channel and the quality of the data signal that is transmitted by the first channel.

A handover control program according to the present invention which, for controlling handover of a mobile station applied to a mobile communications system in which data transmission from base stations to mobile stations is performed by using a first channel shared by a plurality of mobile stations and second channels exclusively used by respective mobile stations, has a computer constituting a mobile station function as: a data signal reception section that receives a data signal transmitted from one of the base stations by the first channel; a control signal reception section that selects and receives a control signal from the base station that is the transmission source of the data signal received by the data signal reception section, of the plurality of control signals transmitted by the second channel; and a reception quality information transmission section for transmitting to the base station information regarding reception quality of the control signal received by the control signal reception section.

By executing the handover control program according to the present invention using a computer (mobile station), during handover, the computer causes the control signal from the base station that performed data transmission by the first channel, of the plurality of control signals that are transmitted by the second channel from the base stations to be selectively received and causes information relating to the reception quality of these control signals to be transmitted to the base station. In this way, transmission control of the data signal transmitted by the base station can be performed in accordance with this reception quality information and the reception quality of the data signal can be maintained by maintaining a balance of the quality of the control signal that is transmitted by the second channel and the quality of the data signal that is transmitted by the first channel.

A handover control program according to the present invention which, for controlling handover of a mobile station applied to a mobile communications system in which data transmission from base stations to mobile stations is performed by using a first channel shared by a plurality of mobile stations and second channels exclusively used by respective mobile stations, has a computer constituting a mobile station function as: a data signal reception section that receives a data signal transmitted from one of the base stations through the first channel; a control signal reception section that receives a control signal transmitted from a plurality of the base stations by the second channel; and a reception power information transmission section that transmits to the base station information regarding the reception power of the control signal from the base station that is the transmission source of the data signal received by the data signal reception section, of the plurality of control signals received by the control signal reception section.

By executing the handover control program according to the present invention using a computer (mobile station), during handover, the computer causes control signals transmitted by the second channel from a plurality of base stations to be received and, of the plurality of control signals that are received, causes the control signal from the base station that performed data transmission by the first channel to be selected and causes information relating to the reception power of this control signal to be transmitted to the base station. In this way, transmission power control of the data signal transmitted from the base station can be performed in accordance with this reception power information and the reception quality of the data signal can be maintained by maintaining a balance of the quality of the control signal that is transmitted by the second channel and the quality of the data signal that is transmitted by the first channel.

A handover control program according to the present invention which, for controlling handover of a mobile station applied to a mobile communications system in which data transmission from base stations to mobile stations is performed by using a first channel shared by a plurality of mobile stations and second channels exclusively used by respective mobile stations, has a computer constituting a mobile station function as: a data signal reception section that receives a data signal transmitted from one of the base stations through the first channel; a control signal reception section that selects and receives a control signal from the base station that is the transmission source of the data signal received by the data signal reception section, of the plurality of control signals transmitted by the second channel; and a reception power information transmission section for transmitting to the base station information regarding the reception power of the control signals from the plurality of base stations received by the control signal reception section.

By executing the handover control program according to the present invention using a computer (mobile station), during handover, the computer causes the control signal from the base station that performed data transmission by the first channel, of the plurality of control signals that are transmitted from the base stations by the second channel to be selectively received and causes information relating to the reception power of these control signals to be transmitted to the base station. In this way, transmission power control of the data signal transmitted by the base station can be performed in accordance with this reception power information and the reception quality of the data signal can be maintained by maintaining a balance of the quality of the control signal that is transmitted by the second channel and the quality of the data signal that is transmitted by the first channel.

According to the present invention, a handover control program as described above may be recorded on a computer-readable recording medium.

By using a computer to read and execute the recorded program of a recording medium on which the above handover control program is recorded, the reception quality of the data signal can be maintained by maintaining a balance of the quality of the control signal that is transmitted by the second channel and the quality of the data signal that is transmitted by the first channel.

DESCRIPTION OF THE PREFERRED EMBODIMENTS

Preferred embodiments of a mobile communication system according to the present invention are described in detail below with reference to the drawings. In the description of the drawings, identical elements are given the same reference symbols and the description thereof is not repeated.

First Embodiment

Figure 1:
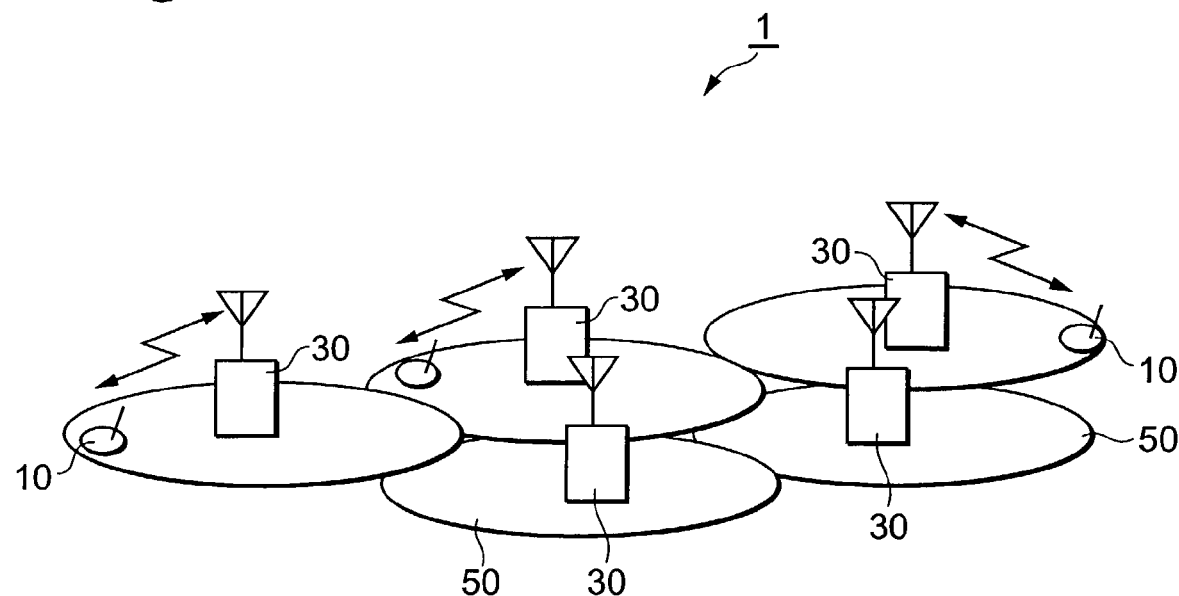
FIG. 1 is a diagram illustrating a mobile communication system according to an embodiment.

FIG. 1 is a diagram illustrating a mobile communication system 1 according to an embodiment. As shown in FIG. 1, a mobile communication system 1 according to an embodiment comprises a plurality of base stations 30 that respectively cover divided wireless zones (called "cells") 50 and mobile stations 10 that perform communication by setting up wireless channels with the base stations 30 and that are present in these wireless zones 50.

Figure 2:
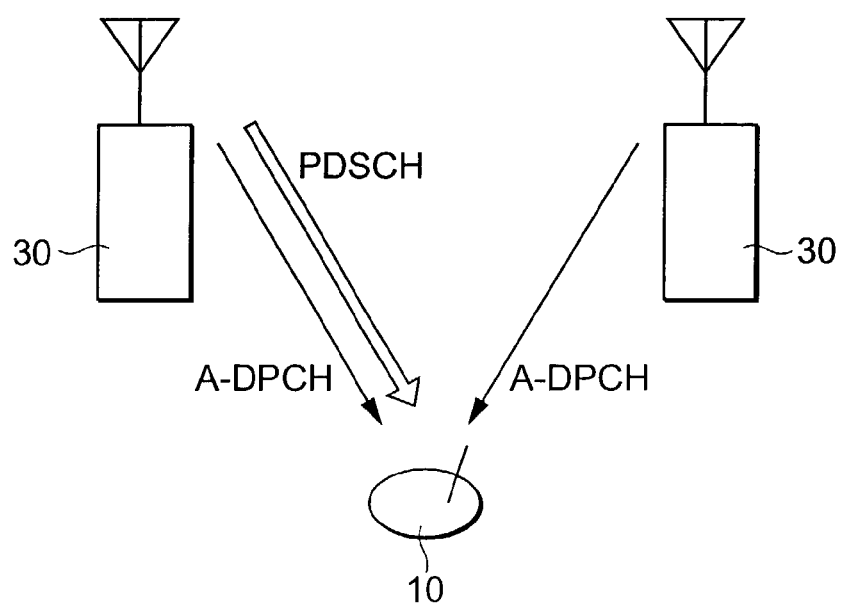
FIG. 2 is a diagram given in explanation of channel set-up applied to a mobile communication system according to an embodiment.

FIG. 2 is a diagram given in explanation of channel set-up applied to the mobile communication system 1 according to an embodiment. As shown in FIG. 2, two communication channels are set up between a base station 30 and a mobile station 10. These are PDSCH, which is utilized in a shared manner by a plurality of mobile stations 10 and A-DPCH, which is exclusively used by respective mobile stations 10. As shown in FIG. 2, signals are transmitted to one mobile station 10 from a plurality of base stations 30 by the A-DPCH but PDSCH is set up by one base station 30 and signals are thereby transmitted from this base station 30. The base station 30 at which the PDSCH is set up is the base station 30 that transmits the pilot channel which gives the highest reception level at the mobile station 10.

Figure 3:
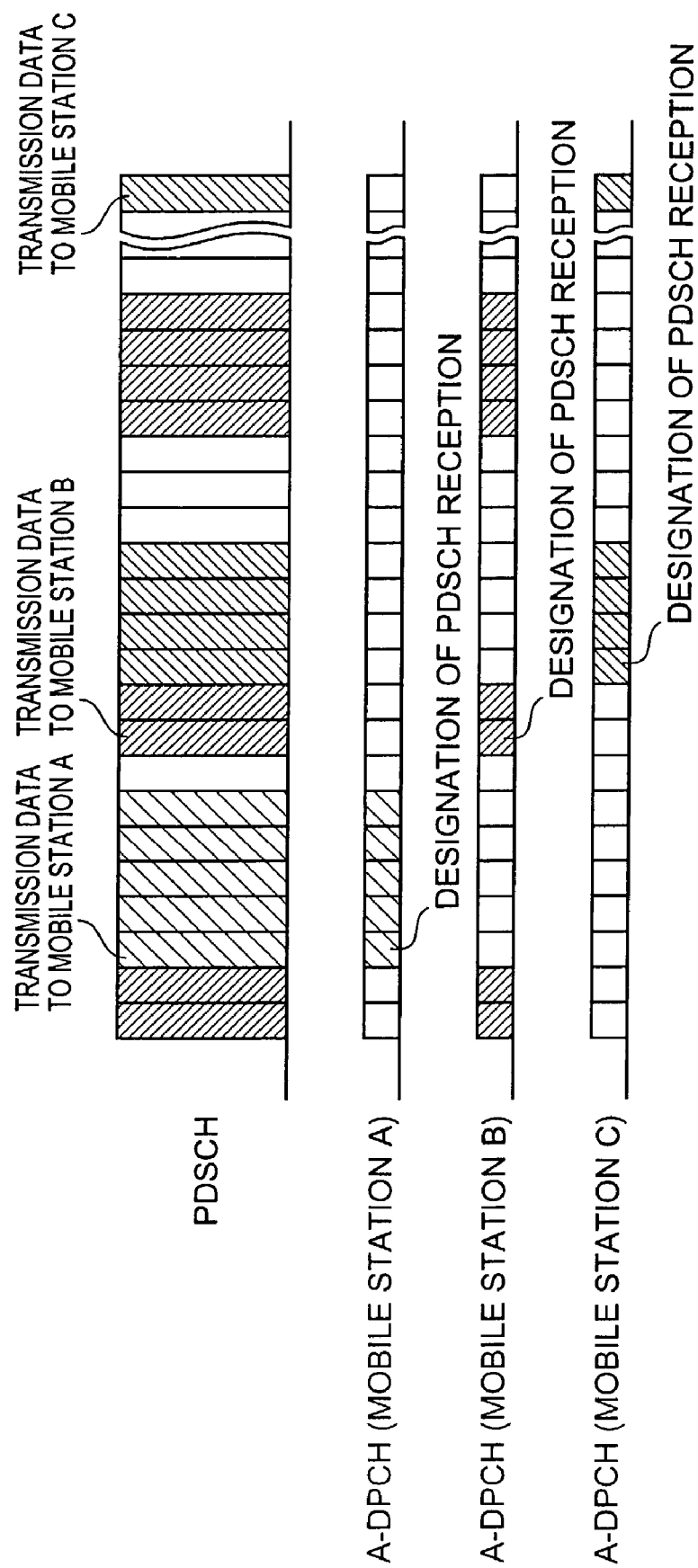
FIG. 3 is a view given in explanation of the construction of PDSCH and A-DPCH used in a mobile communication system according to an embodiment.

The construction of the PDSCH and A-DPCH employed in the mobile communication system 1 according to the embodiment will be described with reference to the diagram shown in FIG. 3. PDSCH is a channel that is shared by a plurality of mobile stations 10; FIG. 3 shows the case where it is used to sequentially transmit data to mobile stations A, B and C. In FIG. 3, the area indicated by the rectangle may be thought of as the wireless frame (10 ms) or the time unit, called TTI (transmission time interval), which is the unit of error coding or interleaving. Data destined for the individual mobile stations 10 arriving at the base station is sequentially transmitted after being allocated the respectively required number of frames in various sequences, depending on its order of arrival and the respective data size. An A-DPCH for exclusive use for each mobile station 10 is then set up separately from the PDSCH. These channels are always set up irrespective of whether there is any data or not. As shown in FIG. 3, when given data is to be transmitted to a mobile station 10 by the PDSCH, a control signal is transmitted by the A-DPCH to the mobile station 10 so that the data signal will be received by the PDSCH. In FIG. 3, to facilitate understanding, the control signals are depicted as if they were transmitted with the same wireless frame timing, but, in fact, the control signals are transmitted before the transmission of the data signals and the mobile station 10 commences PDSCH reception after reception of these instructions.

Figure 4:
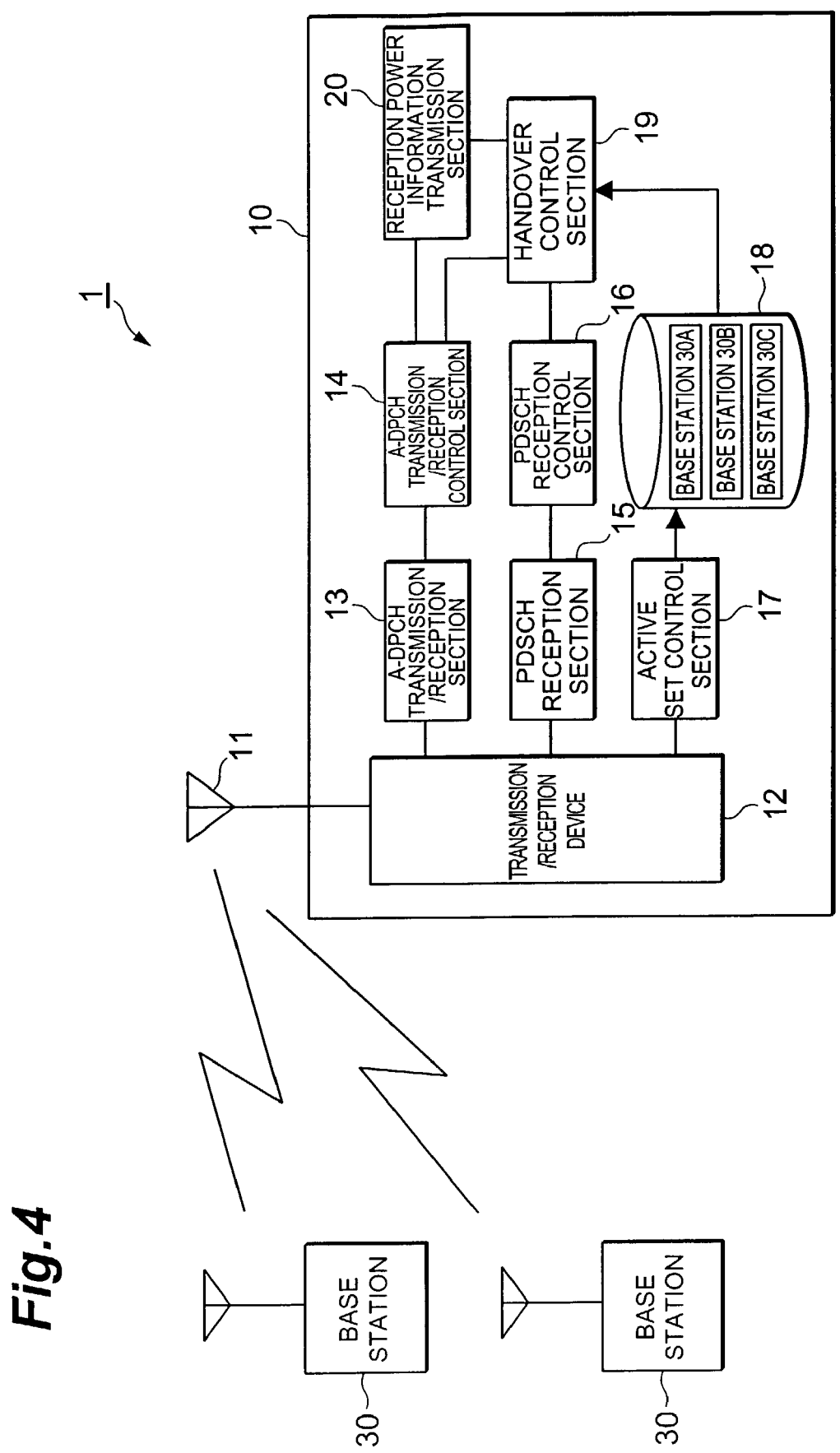
FIG. 4 is a view illustrating a mobile station employed in a mobile communication system according to a first embodiment.

FIG. 4 is a block diagram given in explanation of the construction of a mobile station 10 applied to a mobile communication system 1 according to a first embodiment. The mobile station 10 comprises: an antenna 11, a transmission/reception device 12 that transmits and receives signals through the antenna 11, an A-DPCH transmission/reception section 13 that transmits and receives data by the A-DPCH, an A-DPCH transmission/reception control section 14 that controls transmission/reception of data by the A-DPCH transmission/reception section 13, a PDSCH reception section 15 that receives and decodes data from the PDSCH, a PDSCH reception control section 16 that controls reception/stopping of data by the PDSCH reception section 15, a handover control section 19 that controls the handover operation, an active set control section 17 that controls which base station 30 can constitute a diversity handover branch, and active set storage region 18 that stores the diversity handover branches and a reception power information transmission section 20 that transmits to the base stations 30 information regarding the reception power of the control signal received by the A-DPCH transmission/reception section 13.

The active set control section 17 constantly monitors the common pilot channels of the surrounding cells and comprises a function of selecting a base station 30 (called "active set") that is capable of being a diversity handover branch and a function of storing in the active set storage region 18 the information relating to active set. In this case, base stations 30A, 30B and 30C are selected and stored in active set.

The handover control section 19 has a function of allowing signals to be received by the PDSCH by controlling the PDSCH reception section 15 by means of the PDSCH reception control section 16, after deciding, in accordance with the control information received from the A-DPCH transmission/reception section 13, from which base station 30 the PDSCH signal i.e. the data is to be received.

The reception power information transmission section 20 has a function of selecting a control signal from the plurality of control signals received from the plurality of base stations 30 by the A-DPCH transmission/reception section. The method of selecting the single control signal is that the control signals are analyzed and the base station 30 that transmitted the PDSCH signal is identified and the control signal transmitted from this base station 30 is selected. In addition, the reception power information transmission section 20 has the function of transmitting to the A-DPCH transmission/reception section 13 information relating to the reception power of the control signal that has been selected.

Figure 5:
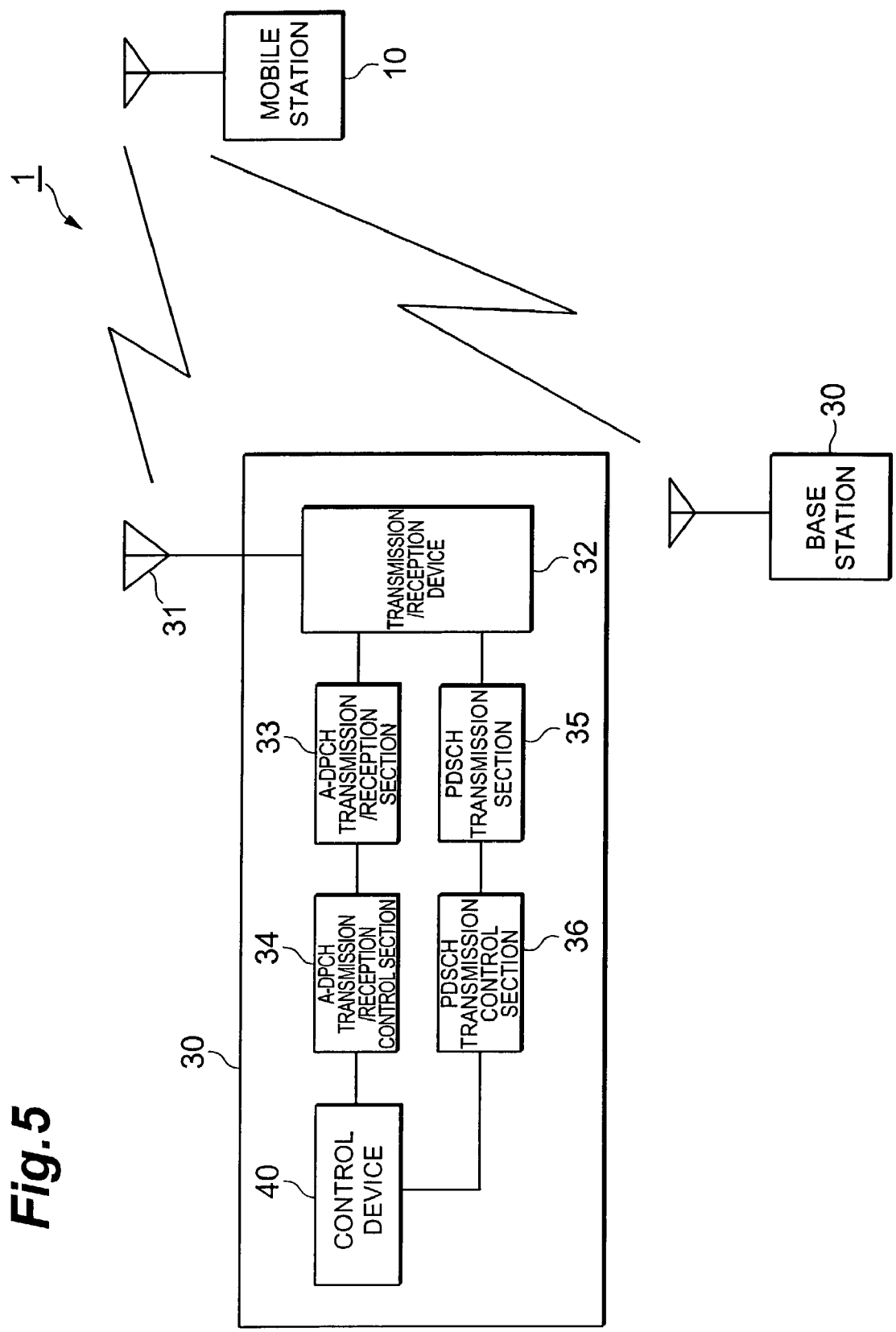
FIG. 5 is a view illustrating a base station employed in a mobile communication system according to the first embodiment.

FIG. 5 is a block diagram given in explanation of the construction of abase station 30 used in a communication system according to the first embodiment. The base station 30 comprises an antenna 31, a transmission/reception device 32 that transmits and receives signals through the antenna 31, an A-DPCH transmission/reception section 33 that transmits and receives data by the A-DPCH, an A-DPCH transmission/reception control section 34 that controls transmission/reception of data by the A-DPCH transmission/reception section 33, a PDSCH transmission section 35 that encodes and transmits data by the PDSCH, a PDSCH transmission control section 36 that controls transmission/stopping of data by the PDSCH transmission section 35 and a control device 40 that performs transmission control such as of the transmission power of the control signal and the data signal.

Figure 6:
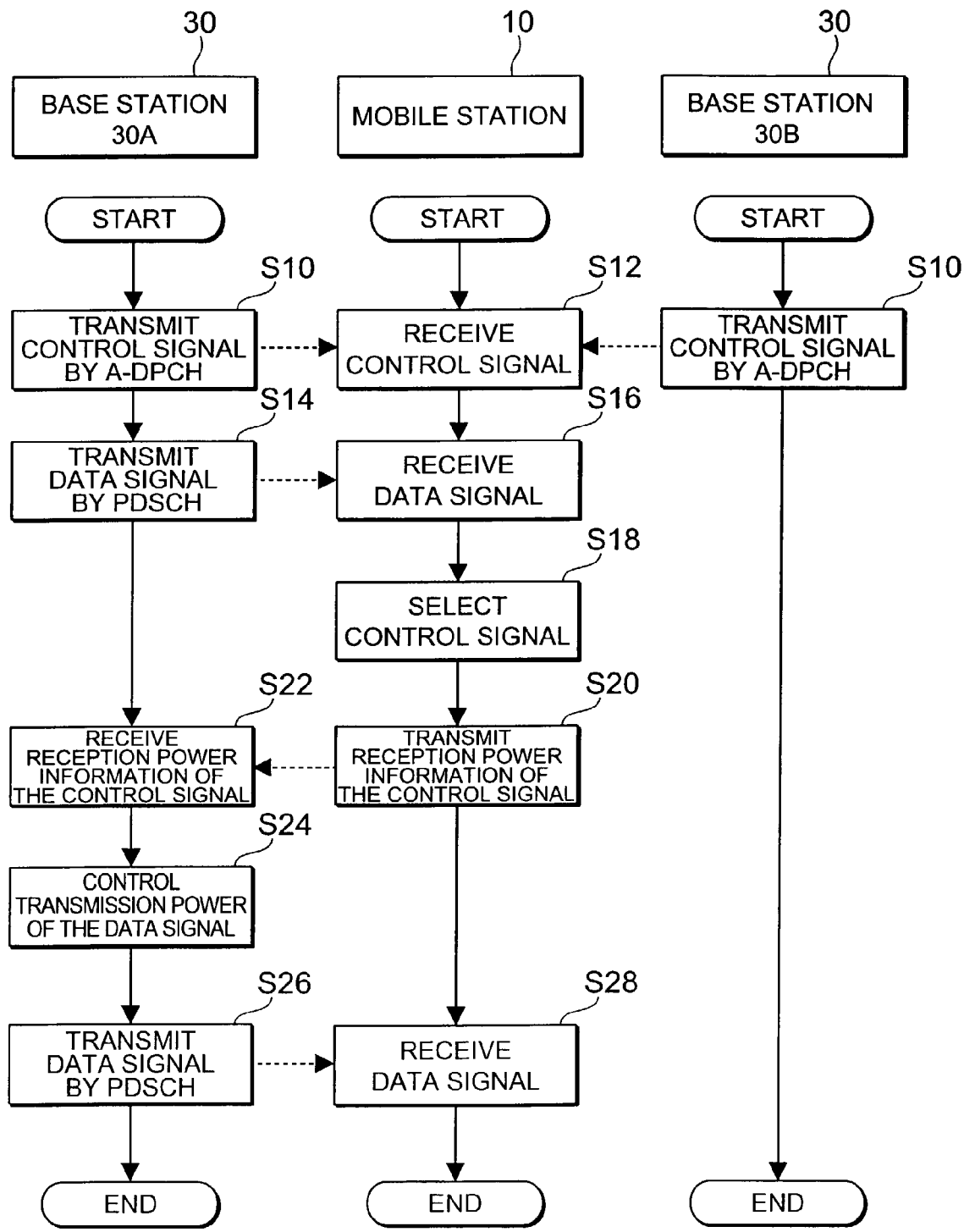
FIG. 6 is a flow chart illustrating the operation of handover control in a mobile communication system according to the first embodiment.

The handover control operation with a mobile communication system 1 according to a first embodiment of the present invention will be described and a method of handover control according to this first embodiment will be described. FIG. 6 is a flow chart illustrating the handover control operation with a mobile communication system 1 according to the first embodiment. In this case, only base stations 30A and 30B are described, but the operation of base stations 30 other than the base station 30A that transmits the data signal is the same as that of the base station 30B.

First of all, the plurality of base stations 30A and 30B transmit (S10) control signals using the A-DPCH to the mobile station 10. The mobile station 10 receives (S12) the control signals transmitted from the base stations 30A and 30B by means of an A-DPCH transmission/reception section. The reason why control signals are transmitted by the A-DPCH from the plurality of base stations 30A, 30B is in order to perform diversity handover using the control signals from the plurality of base stations 30A, 30B in combination. Next, a data signal is transmitted (S14) by the PDSCH to a mobile station 10 by one base station 30A. The mobile station 10 receives (S16) the data signal transmitted from the base station 30A by means of a PDSCH reception section 15. At this point, the handover control section 19 sends instructions to the PDSCH reception control section 16 in accordance with the transmission channel and/or its error correction information contained in the control signal previously received by the A-DPCH and uses the PDSCH reception control section 16 to control the PDSCH reception control section 15 so that the data signal is received.

The base station 30 that transmits the data signal by the PDSCH is then the base station 30A that transmits the pilot channel whose reception level is highest at the mobile station 10. The flow of transmission of the pilot channels to the mobile station 10 from the base stations 30A and 30B, the evaluation of the reception level of the pilot channel at the mobile station 10 and the selection of the base station 30 is the same as in the case of the conventional method, so the operational flow shown in FIG. 6 is omitted.

Next, the mobile station 10 selects one control signal (S18) of the control signals received by the A-DPCH from the plurality of base stations 30A and 30B. The control signal that is selected at this point is the control signal from the base station 30A that transmitted the data signal.

Next, the mobile station 10 transmits (S20) information relating to the reception power of the selected control signal to the base station 30A that transmitted the data signal. In more detail, the reception power information transmission section 20 transmits an instruction to an A-DPCH transmission/reception control section 14 and the A-DPCH transmission/reception control section 14 transmits the reception power information by controlling the A-DPCH transmission/reception section 13. The information relating to the reception power may be the information of the reception power itself or may be information for controlling the transmission power of the data signal that is transmitted by the base station 30A in accordance with the reception power.

The base station 30A receives (S22) the reception power information that is transmitted from the mobile station 10 by means of the A-DPCH transmission/reception section 33. In the base station 30, a control device 40 then controls (S24) the transmission power of the data signal in accordance with the received reception power information. For example, control may be effected by adding a prescribed offset to the reception power and taking this as the transmission power of the data signal. The base station 30A then transmits (S26) the data signal to the mobile station 10 by the PDSCH using the transmission power that is thereby controlled. The mobile station 10 receives (S28) the data signal that is transmitted from the base station 30A by means of the PDSCH reception section. The flow shown in FIG. 6 is repeated until transmission of the data to be transmitted has been completed.

In the mobile communication system 1 according to the first embodiment, the mobile station 10, from the control signals transmitted by the A-DPCH from the plurality of base stations 30A and 30B, selects the control signal from the base station 30A that transmitted the data signal and transmits information relating to the reception power thereof to this base station 30A. The control device 40 that is provided in the base station 30A controls the transmission power of the data signal in accordance with the reception power information received from the mobile station 10. Thus, lowering of the reception quality on the shared channel can be prevented by maintaining a balance of the quality of the data signal obtained by the shared channel and the control signal obtained by the dedicated channel, by controlling the transmission power of the data signal in accordance with the reception power of the control signal that is transmitted from the base station 30A that transmitted the data signal, rather than the combined reception power of the control signals from the plurality of base stations 30A and 30B. Regarding analysis of the information extracted from the control signal, information can be extracted more accurately from the control signals if a plurality of control signals are employed in combination, as conventionally.

Also, likewise with the handover control method according to the first embodiment, lowering of the reception quality of the shared channel can be prevented by selecting, from the control signals received from the plurality of base stations 30A and 30B, the control signal from the base station 30A that transmitted the data signal, transmitting information regarding the reception power to the base station 30A and controlling the transmission power of the data signal in accordance therewith.

Second Embodiment

Next, a mobile communication system according to a second embodiment of the present invention will be described. The basic construction of the mobile communication system according to the second embodiment is the same as that of the mobile communication system 1 (see FIG. 4 and FIG. 5) according to the first embodiment. Unlike the mobile station 10 described in the first embodiment, the mobile station of the mobile communication system according to the second embodiment has a function whereby, instead of selecting one control signal from the plurality of control signals received by the A-DPCH transmission/reception section 13, the A-DPCH transmission/reception section 13 selectively receives a control signal from one base station 30A. Specifically, since the spread spectrum codes when transmitting the control signals by the A-DPCH are different for each base station 30A and 30B, control signals transmitted from base stations other than base station 30A which transmitted the data signal by the PDSCH are discarded without being decoded by the A-DPCH transmission/reception section 13.

Figure 7:
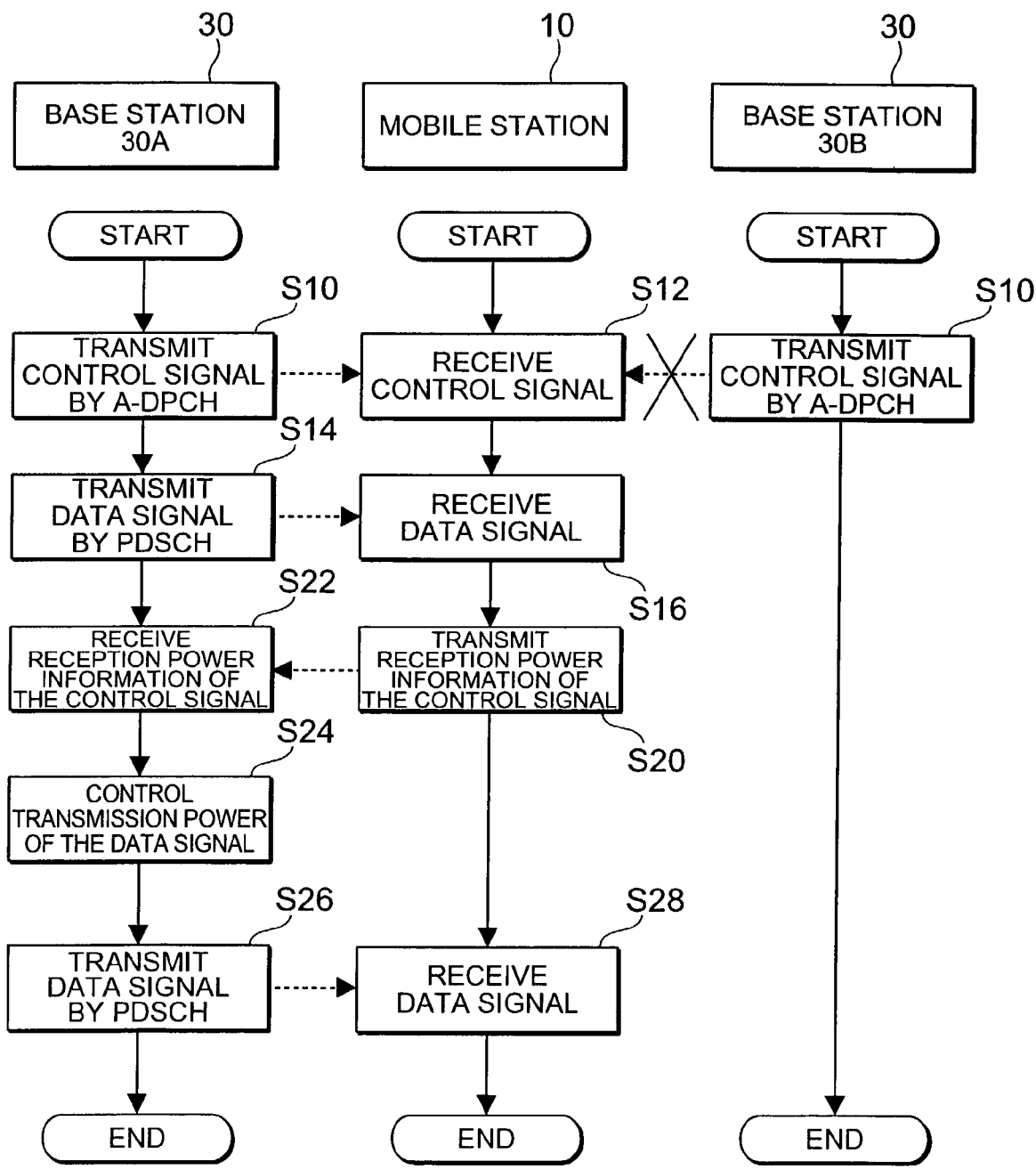
FIG. 7 is a flow chart illustrating the operation of handover control in a mobile communication system according to a second embodiment.

The operation of handover control with the mobile communication system according to the second embodiment of the present invention will be described and the method of handover control according to the second embodiment will be described. FIG. 7 is a flow chart illustrating the operation of handover control with the mobile communication system according to the second embodiment.

First of all, the plurality of base stations 30A and 30B transmit (S10) control signals using the A-DPCH to the mobile station 10. Of the transmitted control signals, the mobile station 10 selectively receives (S12) the control signals from the base stations 30A and 30B that are transmitting transmission data by the PDSCH by means of an A-DPCH transmission/reception section 13. That is, the control signal that is transmitted by the A-DPCH from the base station 30A is received while the control signal that is transmitted by the A-DPCH from the base station 30B is not received. The identification of the base station 30A that transmitted the transmission data by the PDSCH can be performed by referring to the active set that is stored in the active set storage region 18. Specifically, the information that is stored in the active set storage region 18 is constantly updated by the active set control section 17 and is transmitted to the base stations 30A and 30B by the A-DPCH transmission/reception section 13, so that synchronization with the active set information whereby the wireless control device (not shown) controls the base stations 30A and 30B is achieved. Since the base station 30 that transmitted the transmission data by the P-DSCH is determined by the wireless control device in accordance with this active set information, the mobile station 10 can identify the base station 30 that is performing data transmission by the PDSCH by using the information that is managed in the active set storage region 18 within the mobile station 10.

Next, one base station 30A transmits by the PDSCH a data signal to the mobile station 10 (S14). The mobile station 10 receives (S16) the data signal transmitted from the base station 30 by means of the PDSCH reception section 15.

Next, the mobile station 10 transmits (S20) information relating to the reception power of the received control signal to the base station 30A that transmitted the data signal. The base station 30A receives (S22) the information relating to the reception power that is transmitted from the mobile station 10. After this, the flow whereby the transmission power of the data signal is controlled (S24) in accordance with the received reception power information, the data signal is transmitted (S26) to the mobile station 10 from the base station 30A using the transmission power that is thus controlled and the data signal from the base station 30A is received (S28) by the mobile station 10 is the same as in the case of the flow of the handover control operation of the mobile communication system 1 described in the first embodiment.

In the mobile communication system according to the second embodiment, of the control signals transmitted by the A-DPCH from the plurality of base stations 30A, 30B, the mobile station 10 selects and receives the control signal from the base station 30A that transmitted the data signal and transmits to the base station 30A information regarding its reception power. The control device 40 that is provided in the base station 30A then controls the transmission power of the data signal in accordance with the reception power information. Thus, lowering of the reception quality on the shared channel can be prevented by maintaining a balance of the quality of the data signal obtained by the shared channel and the control signal obtained by the dedicated channel, in the same way as in the case of the mobile communication system 1 according to the first embodiment. Also, since the A-DPCH transmission/reception section selects the control signal for reception, there is no need to perform processing of control signals that are not selected, so the reception load in the mobile station 10 can be reduced and reduction of power consumption achieved.

Also, likewise with the handover control method according to the second embodiment, lowering of the reception quality of the shared channel can be prevented by selecting for reception, from the plurality of control signals, the control signal from the base station 30A that transmitted the data signal, transmitting information regarding the reception power to the base station 30A and controlling the transmission power of the data signal in accordance therewith.

Third Embodiment

A mobile communication system according to a third embodiment of the present invention will now be described. The basic construction of the mobile communication system according to the third embodiment is the same as that of the mobile communication system 1 (see FIG. 4 and FIG. 5) according to the first embodiment. Unlike the mobile station 10 according to the first embodiment, the mobile station of the mobile communication system according to the third embodiment has a function whereby, instead of selecting one control signal from the plurality of control signals received by the A-DPCH transmission/reception section 13 and transmitting to the base station 30A, a reception power information transmission section 20 transmits to the base station 30A reception power information of the respectively received control signals. Also the control device 40 that is provided in the base station 30 of the mobile communication system according to the third embodiment has a function of selecting, from the plurality of items of reception power information transmitted from the mobile stations 10, the reception power information of the control signal that was transmitted from the base station 30A in question and of performing control of the transmission power of the data signal by the P-DSCH in accordance with the reception power information in question.

Figure 8:
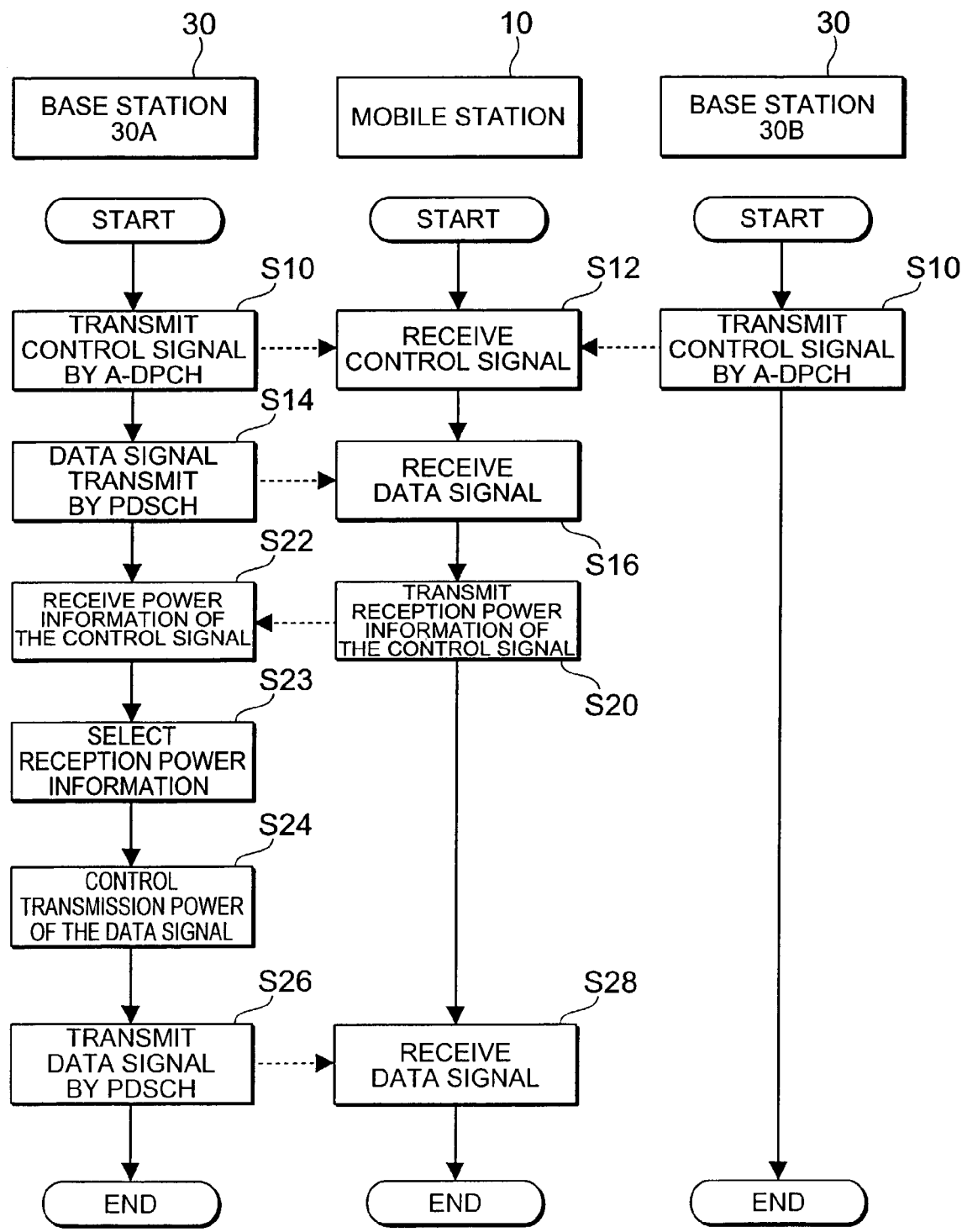
FIG. 8 is a flow chart illustrating the operation of handover control in a mobile communication system according to a third embodiment.

The operation of handover control with the mobile communication system according to the third embodiment of the present invention will be described and the method of handover control according to the third embodiment will be described. FIG. 8 is a flow chart illustrating the operation of handover control with the mobile communication system according to the third embodiment.

First of all, the plurality of base stations 30A and 30B transmit (S10) control signals using the A-DPCH to the mobile station 10. The mobile stations 10 receive (S12) the control signals that are transmitted from the base stations 30A and 30B by means of the A-DPCH transmission/reception section 13.

Next, one base station 30A transmits (S14) the data signal using the PDSCH to the mobile stations 10. The mobile station 10 receives (S16) the data signal that has been transmitted from the base station 30A by means of the PDSCH reception section 15. Next, the mobile station 10 transmits (S20) information regarding the reception power of the control signal received from the respective base stations 30A and 30B to the base station 30A that transmitted the data signal. The base station 30A receives (S22) the items of information relating to reception power transmitted from the mobile stations 10.

Next, of the plurality of items of reception power information that it has received, the control device 40 provided in the base station 30A selects the reception power information (S23) of the control signal that was transmitted from the base station 30A in question and controls (S24) the transmission power of the data transmission by the P-DSCH in accordance with the reception power information in question. The base station 30A then transmits (S26) the data signal to the mobile stations 10 by the PDSCH, using the thus-controlled transmission power. The mobile station 10 receives (S28) the data signal that has been transmitted from the base station 30A. This flow is repeated until transmission of the data that is to be transmitted has been completed.

In the mobile communication system according to the third embodiment, the control signals that are transmitted by the A-DPCH from the plurality of base stations 30A, 30B are received by the mobile stations 10 and information regarding the reception power of the control signals from the respective base stations 30A and 30B is transmitted to the base station 30A. The control device 40 that is provided in the base station 30A then selects one item of reception power information from the plurality of items of reception power information transmitted from the mobile stations 10 and controls the transmission power of the data signal in accordance with the reception power information. In this way, in the same way as in the case of the mobile communications system 1 according to the first embodiment, lowering of the reception quality on the shared channel can be prevented by maintaining a balance of the quality of the data signal obtained by the shared channel and the control signal obtained by the dedicated channel.

Also, likewise, in the handover control method according to the third embodiment also, a mobile station 10 receives control signals from a plurality of base stations 30A and 30B and transmits information relating to the reception power of the respective control signals to the base station 30A. Thus, lowering of the reception quality of the shared channel can be prevented by selecting one of the items of reception power information of the items of reception power information that were transmitted and controlling the transmission power of the data signal in accordance therewith.

Fourth Embodiment

Finally, a handover control program according to an embodiment of the present invention and a computer-readable recording medium on which this handover control program is recorded (hereinbelow simply called a "recording medium") will be described. A recording medium means a medium that, in accordance with the content of program statements, is capable of transmitting the content of program statements to a reading device in the form of signals corresponding to change condition of magnetic, optical or electrical etc energy created therein, in respect of a reading device that is provided in the hardware resources of a computer. Examples of such recording media are magnetic disks, optical discs, CD-ROMs or memory incorporated in a computer.

Figure 9:
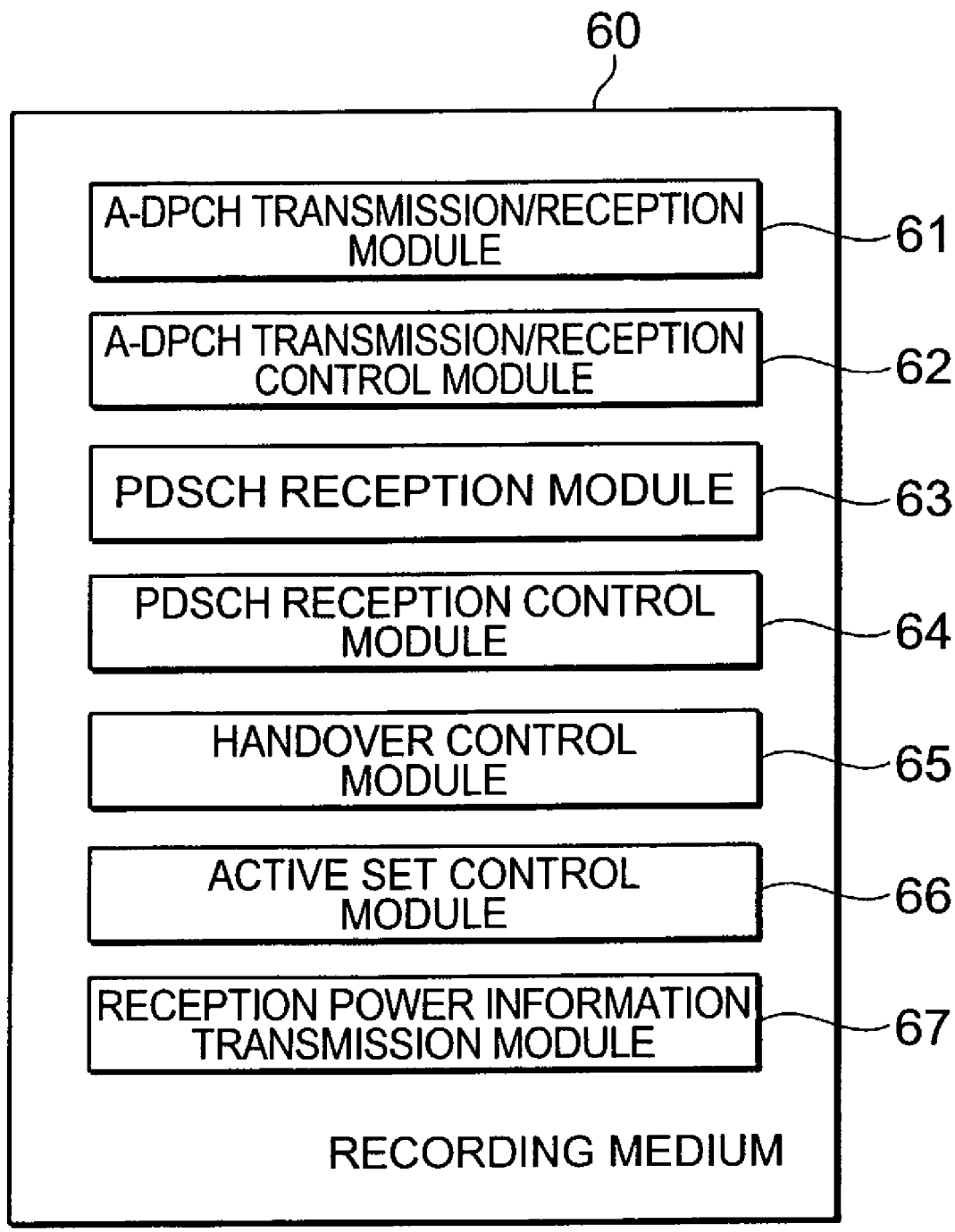
FIG. 9 is a view illustrating the construction of a recording medium according to a fourth embodiment.

FIG. 9 is a layout diagram of a recording medium 60 according to an embodiment of the present invention. As shown in FIG. 9, a handover control program comprising a plurality of modules is recorded on a recording medium. The handover control program is a program that performs handover control of a mobile station in a mobile communication system wherein data transmission is performed by a first channel shared by a plurality of mobile stations and second channels dedicated to the respective mobile stations. An example of a computer on which this handover control program is executed is a mobile terminal such as a mobile telephone. As shown in FIG. 9, the handover control program comprises an A-DPCH transmission/reception module 61 that causes a computer to transmit and to receive data using an A-DPCH, an A-DPCH transmission/reception control module 62 that causes a computer to control transmission/reception of data by the A-DPCH transmission/reception module 61, a PDSCH reception module 63 that causes a computer to receive and to decode data obtained by the PDSCH, a PDSCH reception control module 64 that causes a computer to control reception/stopping of data generated by the PDSCH reception model 63, a handover control module 65 that causes a computer to control the handover operation, an active set control module 66 that causes a computer to control which base stations can be used as diversity handover branches and a reception power information transmission modules 67 that causes a computer to transmit to the base station information regarding the reception power of the control signal that is received by the A-DPCH. The functions that are implemented by using the computer to execute the A-DPCH transmission/reception module 61, the A-DPCH transmission/reception control module 62, the PDSCH reception module 63, PDSCH reception control module 64, the handover control module 65 and reception power information transmission module 67 are the same as the respective functions of the A-DPCH transmission/reception section 13, the A-DPCH transmission/reception control section 14, the PDSCH reception section 15, the PDSCH reception control section 16, the handover control section 19 and the reception power information transmission section 20 in a mobile station 10 of a mobile communication system 1 according to the first embodiment. Also, regarding the functions realized by executing the active set control module 66 by the computer, in addition to the function of the active set control section 17 in the mobile station 10 in the mobile communication system 1 according to the first embodiment, there is provided a function of constituting, in the computer whereby the handover control program is executed, a storage region in which is stored the same information as that of the active set region 18 of the mobile station 10 in question.

Figure 10:
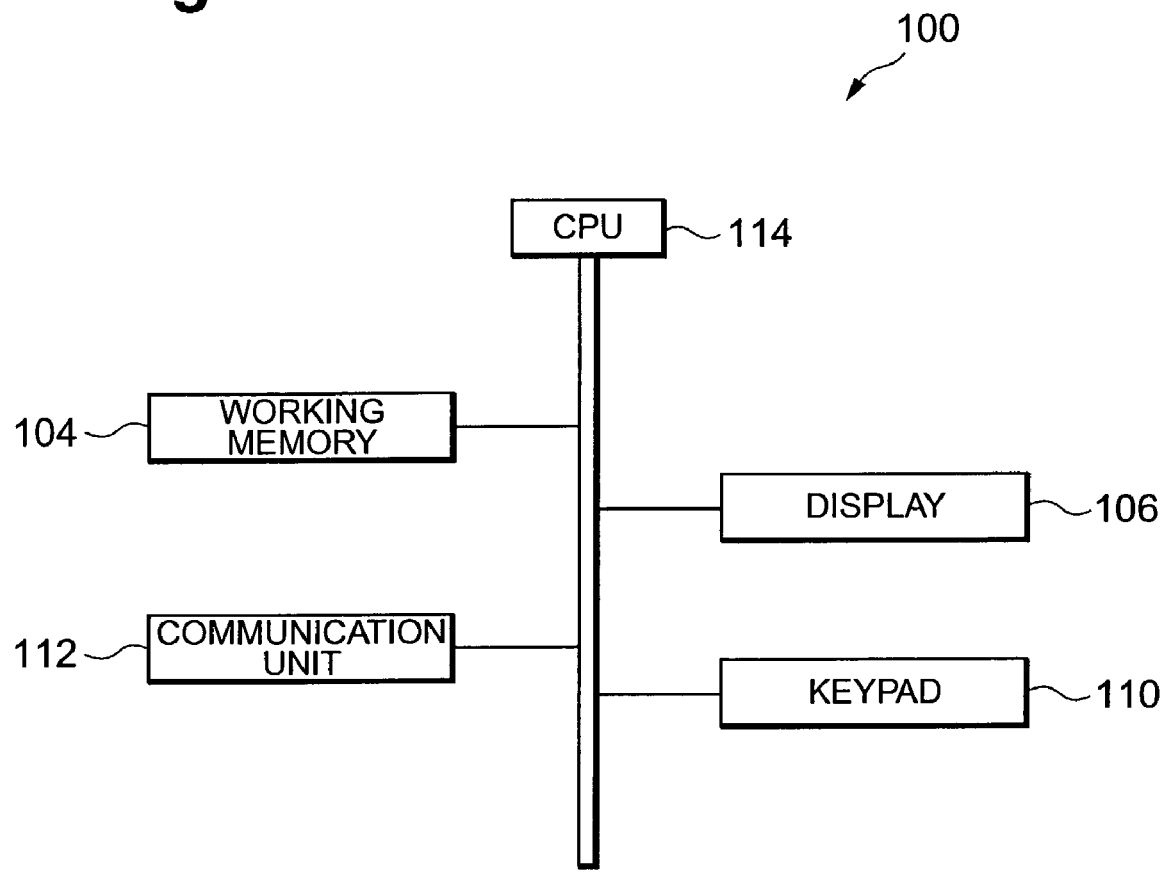
FIG. 10 is a system layout diagram of a computer for executing a handover control program recorded on a recording medium.
Figure 11:
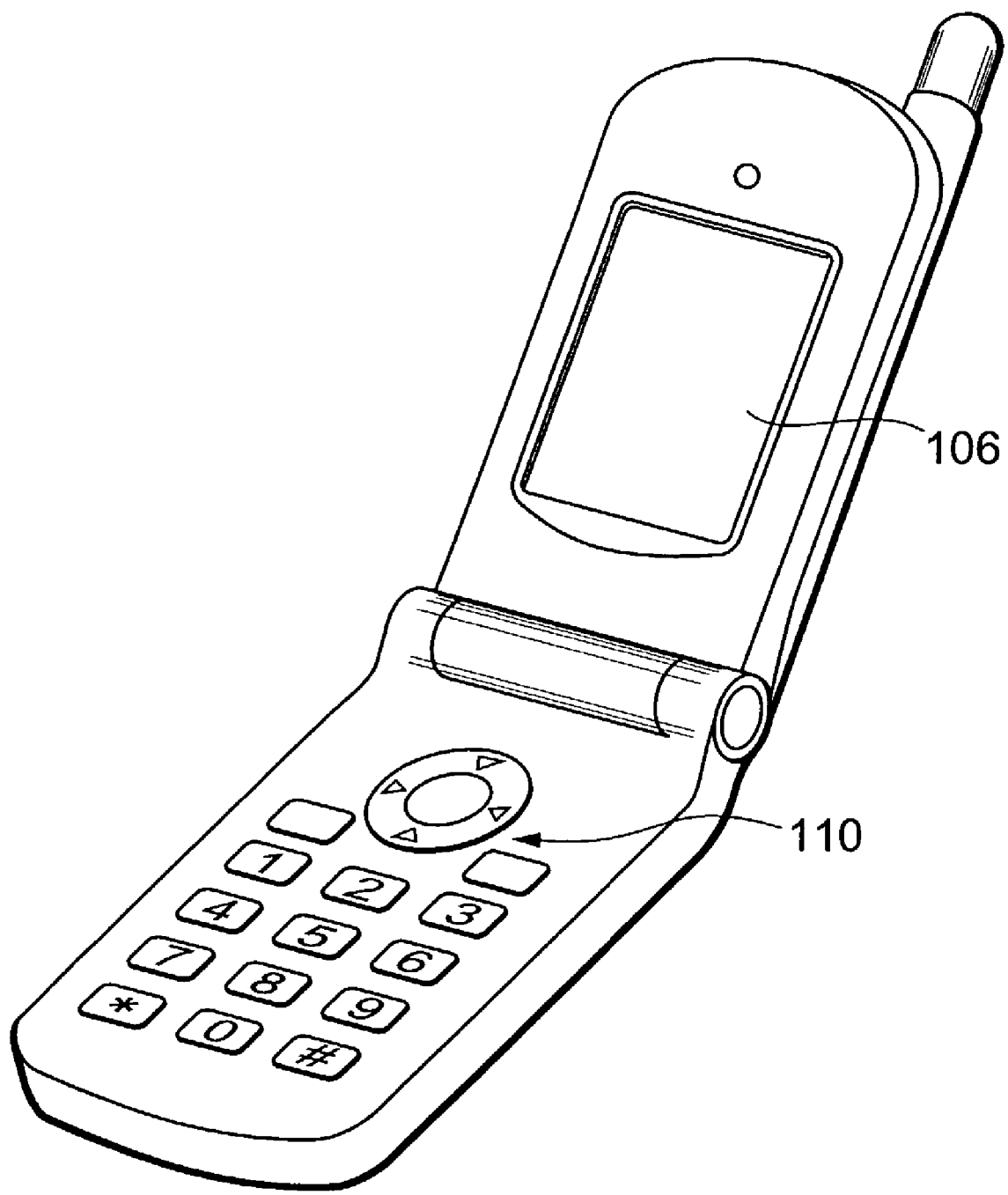
FIG. 11 is a perspective view of a computer for executing a handover control program recorded on a recording medium.

FIG. 10 is a system layout diagram of a computer for executing the handover control program that is recorded on the recording medium 60. FIG. 11 is a perspective view of a computer (in this case, a mobile telephone) for executing the handover control program recorded on the recording medium 60. As shown in FIG. 10 and FIG. 11, the computer comprises working memory (RAM) 104 in which the operating system is permanently loaded, a display 106 constituting display means, a keypad 110 constituting input means, a communication unit 112 constituting communication means and a CPU 114 that controls execution etc of the handover control program.

By installing the handover control program on the computer by the recording medium and executing the handover control program by the computer, in accordance with the fourth embodiment, control identical with the handover control performed by the mobile stations 10 in accordance with the first embodiment can be executed and lowering of the reception quality of the shared channel can thereby be prevented by maintaining a balance of the quality of the data signal employed on the shared channel and the control signal using the dedicated channel, during handover.

Fifth Embodiment

Next, a handover control program and a recording medium on which a handover control program is recorded according to a fifth embodiment are described. The layout of the recording medium on which the handover control program according to the fifth embodiment is recorded is basically the same as that of the recording medium 60 according to the fourth embodiment (see FIG. 9). However, it differs from the recording medium 60 according to the fourth embodiment in that the function executed by the A-DPCH transmission/reception module recorded on the recording medium according to the fifth embodiment is the same as the function possessed by the A-DPCH transmission/reception section 13 possessed by the mobile station 10 in the mobile communication system according to the second embodiment. That is, by making the computer execute the A-DPCH transmission/reception module in the fifth embodiment, the control signal from the base station that performs data transmission by the PDSCH is made to be selectively received by the computer.

By installing the handover control program recorded on the recording medium on the computer and executing the handover control program by the computer, in accordance with the fifth embodiment, control identical with the handover control performed by the mobile stations in accordance with the second embodiment can be executed and lowering of the reception quality of the shared channel can thereby be prevented by maintaining a balance of the quality of the data signal employing the shared channel and the control signal using the dedicated channel, during handover.

Although embodiments of the present invention have been described in detail above, the present invention is not restricted to the above embodiments. Whereas, in the above embodiments, the information relating to the reception power is transmitted from the mobile stations 10 to the base stations 30, and control of the transmission power of the shared channel is arranged to be performed by means of a control device 40 provided in the base station 30, the present invention is not restricted to control of the transmission power in accordance with reception power information and could be applied generally to transmission control of shared channels. For example, it could be arranged for the transmission power of the shared channel to be controlled by the control device 40 provided in the base station 30 in accordance with reception quality information by transmitting information relating to reception quality, such as the signal power to interfering power ratio (SIR) to the base station 30 from the mobile station 10. Also, it could be arranged for information relating to the error correction factor to be transmitted from the mobile station 10 to the base station 30 and the transmission rate of the shared channel to be controlled in accordance with information relating to the error correction factor by the control device 40 provided in the base station 10. Furthermore, such transmission control could be applied not only to the shared channel but also to the dedicated channels of the mobile stations.

Also, although, in the above embodiments, the control device 40 was provided within a base station 30, the control device could be provided outside the base stations 30: for example, it could be provided in a wireless control device that controls a plurality of base stations 30.

According to the present invention, during handover, transmission control of the data signal that is transmitted by the base station can be performed in accordance with the reception quality information in question by receiving control signals transmitted from a plurality of base stations by a second channel (dedicated channel of the mobile station) and, of the plurality of received control signals, selecting the control signal from the base station that is performing data transmission by a first channel (shared channel) and transmitting information regarding the reception quality of this control signal to the base station. In this way, the reception quality of the data signal can be maintained by maintaining a balance of the quality of the control signal that is transmitted by the second channel and the quality of the data signal that is transmitted by the first channel.

Also, according to the present invention, during handover, transmission control of the data signal that is transmitted by the base station can be performed in accordance with the reception quality information in question by selectively receiving control signals from the base station that performs data transmission by a first channel, of the control signals transmitted from a plurality of base stations by a second channel and transmitting information regarding the reception quality of this control signal to the base station. In this way, the reception quality of the data signal can be maintained by maintaining a balance of the quality of the control signal that is transmitted by the second channel and the quality of the data signal that is transmitted by the first channel.

What is claimed is:

1. A mobile station comprising:
   a data signal reception section configured to receive a data signal transmitted from a predetermined one of a plurality of base stations through a first channel, wherein said first channel is a channel that the predetermined one of the plurality of base stations uses to transmit data to a plurality of mobile stations;
   a control signal reception section configured to receive a plurality of control signals transmitted from the plurality of base stations through a second channel that the plurality of base stations use to transmit data exclusively to the mobile station; and
   a reception quality information transmission section configured to identify a control signal from the plurality of control signals, the identified control signal corresponding to the predetermined one of the plurality of base stations which already transmits a data signal through the first channel, and to transmit reception quality information to only the predetermined one of the plurality of base stations, in which the reception quality information informs the predetermined one of the plurality of base stations of a reception quality of the identified control signal and enables the predetermined one of the plurality of base stations to perform transmission control of the data signal transmitted through said first channel based on the reception quality information.

2. A mobile communication system comprising:
   the mobile station according to claim 1;
   the predetermined one of the plurality of base stations; and
   a control device configured to perform transmission control of the data signal and the identified control signal transmitted by said predetermined one of the plurality of base stations,
   wherein said control device is configured to perform transmission control of the data signal transmitted through said first channel in accordance with reception quality information transmitted from said mobile station.

3. A mobile communication system comprising:
   the mobile station according to claim 1;
   the predetermined one of the plurality of base stations; and
   a control device that is configured to perform transmission control of the data signal and the identified control signal transmitted by said predetermined one of the plurality of base stations,
   wherein said control device is configured to perform control of a transmission power of the data signal transmitted through said first channel in accordance with reception quality information transmitted from said mobile station.

4. A mobile station comprising:
   a data signal reception section configured to receive a data signal transmitted from a predetermined one of a plurality of base stations through a first channel, wherein said first channel is a channel that the predetermined one of the plurality of base stations uses to transmit data to a plurality of mobile stations;

a control signal reception section configured to receive a plurality of control signals transmitted from the plurality of base stations through a second channel that the plurality of base stations use to transmit data exclusively to the mobile station; and a reception power information transmission section configured to select a control signal from the plurality of control signals, the selected control signal corresponding to the predetermined one of the plurality of base stations which already transmits a data signal through the first channel, and to transmit reception power information to only the predetermined one of the plurality of base stations in which the reception power information informs the predetermined one of the plurality of base stations of a reception power of the selected control signal and enables the predetermined one of the plurality of base stations to perform control of a transmission power of the data signal transmitted through said first channel based on the reception power information.

5. A mobile communication system comprising:
the mobile station according to claim 4;
the predetermined one of the plurality of base stations; and
a control device configured to perform transmission control of the data signal and the identified control signal transmitted by said predetermined one of the plurality of base stations,
wherein said control device is configured to perform control of a transmission power of a data signal transmitted through said first channel in accordance with reception power information transmitted from said mobile station.

6. A handover control method comprising:
transmitting a data signal from a predetermined one of a plurality of base stations to one of a plurality of mobile stations through a first channel, wherein said first channel is a channel that the predetermined one of the plurality of base stations uses to transmit data to the plurality of mobile stations;
transmitting a plurality of control signals from the plurality of base stations to said one of the plurality of mobile stations through a second channel that the plurality of base stations use to transmit data exclusively to the one of the plurality of mobile stations;
receiving, at said one of the plurality of mobile stations, the plurality of control signals;
identifying, at said one of the plurality of mobile stations, a control signal from the plurality of control signals, the identified control signal corresponding to the predetermined one of the plurality of base stations;
transmitting, from said one of the plurality of mobile stations, reception quality information to only the predetermined one of the plurality of base stations in which the reception quality information informs the predetermined one of the plurality of base stations of a reception quality of the identified control signal and enables the predetermined one of the plurality of base stations to perform transmission control of the data signal transmitted through said first channel based on the reception quality information;
receiving, at the predetermined one of the plurality of base stations, said reception quality information transmitted from said one of the plurality of mobile stations; and
performing, at the predetermined one of the plurality of base stations, transmission control on the data signal transmitted by said one of the plurality of base stations, in accordance with the received reception quality information.

7. A handover control method comprising:
transmitting a data signal from a predetermined one of a plurality of base stations to one of a plurality of mobile stations through a first channel, wherein said first channel is a channel that the predetermined one of the plurality of base stations uses to transmit data to the plurality of mobile stations;
transmitting a plurality of control signals from the plurality of base stations to said one of the plurality of mobile stations through a second channel that the plurality of base stations use to transmit data exclusively to said one of the plurality of mobile stations;
receiving, at said one of the plurality of mobile stations, the plurality of control signals;
identifying, at said one of the plurality of mobile stations, a control signal from the plurality of control signals, the identified control signal corresponding to the predetermined one of the plurality of base stations;
transmitting, from said one of the plurality of mobile stations, reception quality information to only the predetermined one of the plurality of base stations in which the reception quality information informs the predetermined one of the plurality of base stations of a reception quality of the identified control signal and enables the predetermined one of the plurality of base stations to perform transmission power control of the data signal transmitted through said first channel based on the reception quality information;
receiving, at the predetermined one of the plurality of base stations, said reception quality information transmitted from said one of the plurality of mobile stations; and
performing, at the predetermined one of the plurality of base stations, transmission power control on the data signal transmitted by said predetermined one of the plurality of base stations, in accordance with the received reception quality information.

8. A handover control method comprising:
transmitting a data signal from a predetermined one of a plurality of base stations to one of a plurality of mobile stations through a first channel, wherein said first channel is a channel that the predetermined one of the plurality of base stations uses to transmit data to the plurality of mobile stations;
transmitting a plurality of control signals from the plurality of base stations to said one of the plurality of mobile stations through a second channel that the plurality of base stations use to transmit data exclusively to the one of the plurality of mobile stations;
receiving, at said one of the plurality of mobile stations, the plurality of control signals;
identifying, at said one of the plurality of mobile stations, a control signal from the plurality of control signals, the selected control signal corresponding to the predetermined one of the plurality of base stations;
transmitting, from said one of the plurality of mobile stations, reception power information to only the predetermined one of the plurality of base stations in which the reception power information informs the predetermined one of the plurality of base stations of a reception power of the identified control signal and enables the predetermined one of the plurality of base stations to perform transmission power control of the data signal transmitted through said first channel based on the reception power information;

receiving, at the predetermined one of the plurality of base stations, the reception power information transmitted from said one of the plurality of mobile stations; and performing, at the predetermined one of the plurality of base stations, transmission power control on the data signal, in accordance with the received reception power information.

9. A computer-readable recording medium encoded with instructions, which when executed on a computer causes the computer to execute a method comprising:

receiving a data signal transmitted from a predetermined one of a plurality of base stations through a first channel, wherein said first channel is a channel that the predetermined one of the plurality of base stations uses to transmit data to a plurality of mobile stations;

receiving a plurality of control signals transmitted from the plurality of base stations through a second channel that the plurality of base stations use to transmit data exclusively to one of the plurality of mobile stations which corresponds to the computer;

selecting a control signal from the plurality of control signals, the selected control signal corresponding to the predetermined one of the plurality of base stations; and transmitting reception quality information to only the predetermined one of the plurality of base stations, in which the reception quality information informs the predetermined one of the plurality of base stations of a reception quality of the selected control signal and enables the predetermined one of the plurality of base stations to perform transmission control of the data signal transmitted through said first channel based on the reception quality information.

10. A computer-readable recording medium encoded with instructions, which when executed on a computer causes the computer to execute a method comprising:

receiving a data signal transmitted from a predetermined one of a plurality of base stations through a first channel, wherein said first channel is a channel that the predetermined one of the plurality of base stations uses to transmit to a plurality of mobile stations;

receiving a plurality of control signals transmitted from the plurality of base stations through a second channel that the plurality of base stations use to transmit data exclusively to one of the plurality of mobile stations which corresponds to the computer;

selecting a control signal from the plurality of control signals, the selected control signal corresponding to said predetermined one of the plurality of base stations; and transmitting reception power information to only the predetermined one of the plurality of base stations in which the reception power information informs the predetermined one of the plurality of base stations of a reception power of the selected control signal and enables the predetermined one of the plurality of base stations to perform transmission power control of the data signal transmitted through said first channel based on the reception power information.

* * * * *